(12) United States Patent
Lee et al.

(10) Patent No.: US 12,550,526 B2
(45) Date of Patent: Feb. 10, 2026

(54) DISPLAY DEVICE INCLUDING GLASS SUBSTRATE PORTIONS WITH INCLINED SIDE SURFACES

(71) Applicant: Samsung Display Co., Ltd., Yongin-si (KR)

(72) Inventors: Younghoon Lee, Yongin-si (KR); Daesang Yun, Yongin-si (KR); Wanjung Kim, Yongin-si (KR); Yiseul Um, Yongin-si (KR); Hyoyoung Mun, Yongin-si (KR); Soyoung Lee, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 664 days.

(21) Appl. No.: 17/897,816

(22) Filed: Aug. 29, 2022

(65) Prior Publication Data

US 2023/0121948 A1      Apr. 20, 2023

(30) Foreign Application Priority Data

Oct. 19, 2021   (KR) .......................... 10-2021-0139251

(51) Int. Cl.
*H10K 50/84*       (2023.01)
*H10K 50/844*      (2023.01)
(Continued)

(52) U.S. Cl.
CPC ......... *H10K 50/844* (2023.02); *H10K 59/131* (2023.02); *H10K 59/40* (2023.02);
(Continued)

(58) Field of Classification Search
CPC .............. H10K 50/844; H10K 50/841; H10K 50/8445; H10K 59/131; H10K 59/40;
(Continued)

(56) References Cited

U.S. PATENT DOCUMENTS 11,205,769 B2   12/2021   Lee et al.
12,058,906 B2    8/2024   Lee et al.
(Continued)

FOREIGN PATENT DOCUMENTS

KR      2020013057 A  *  11/2020  .............. G09F 9/301
KR     20200130571 A      11/2020
(Continued)

*Primary Examiner* — Ida M Soward
(74) *Attorney, Agent, or Firm* — CANTOR COLBURN LLP

(57) ABSTRACT

A display device includes a first glass substrate including a first side surface which is partially inclined, a second glass substrate including a second side surface which is partially inclined, the second glass substrate being apart from the first glass substrate, a display layer including a first area on the first glass substrate, a light-emitting device in the first area, a bending area extending from the first area, and a second area extending from the bending area and on the second glass substrate, and an encapsulation layer on the display layer, the encapsulation layer including an inorganic encapsulation layer and an organic encapsulation layer. Each of the first side surface and the second side surface is adjacent to the bending area.

15 Claims, 28 Drawing Sheets

(51) Int. Cl.
  H10K 59/131 (2023.01)
  H10K 59/40 (2023.01)
  H10K 71/00 (2023.01)
  *G06F 1/16* (2006.01)
  *G09F 9/30* (2006.01)
  *H10K 77/10* (2023.01)
  *H10K 102/00* (2023.01)

(52) U.S. Cl.
  CPC ........... H10K 71/00 (2023.02); *G06F 1/1652* (2013.01); *G09F 9/301* (2013.01); *H10K 77/111* (2023.02); *H10K 2102/311* (2023.02)

(58) Field of Classification Search
  CPC .... H10K 59/873; H10K 77/10; H10K 77/111; H10H 59/142; H01L 25/073; G06F 1/1652; G06F 3/041; G06F 9/301
  See application file for complete search history.

(56) References Cited

U.S. PATENT DOCUMENTS

| | | |
|---|---|---|
| 2015/0146387 A1 | 5/2015 | Lee |
| 2016/0209582 A1 | 7/2016 | Kawata |
| 2016/0212890 A1 | 7/2016 | Jeong et al. |
| 2017/0352834 A1* | 12/2017 | Kim ..................... H10K 77/111 |
| 2018/0090699 A1* | 3/2018 | Shin ..................... H10K 59/353 |
| 2018/0175323 A1* | 6/2018 | Ahn ..................... H10K 50/844 |
| 2020/0004295 A1* | 1/2020 | Paek ..................... G06F 1/1652 |
| 2021/0202669 A1* | 7/2021 | Paek ..................... H10K 77/111 |
| 2021/0202853 A1 | 7/2021 | An et al. |
| 2021/0202868 A1* | 7/2021 | Paek ..................... H10K 59/12 |
| 2022/0102468 A1* | 3/2022 | Lee ..................... H10K 71/00 |

FOREIGN PATENT DOCUMENTS

| | | | | |
|---|---|---|---|---|
| KR | 1020200144626 A | 12/2020 | | |
| KR | 1020200145881 A | 12/2020 | | |
| KR | 1020210019617 A | 2/2021 | | |
| KR | 1020210055854 A | 5/2021 | | |
| KR | 20210086285 A | 7/2021 | | |
| TW | 202130596 A * | 8/2021 | .......... | H04M 1/0269 |
| WO | WO-2020226267 A1 * | 11/2020 | ............. | G09F 9/301 |

* cited by examiner

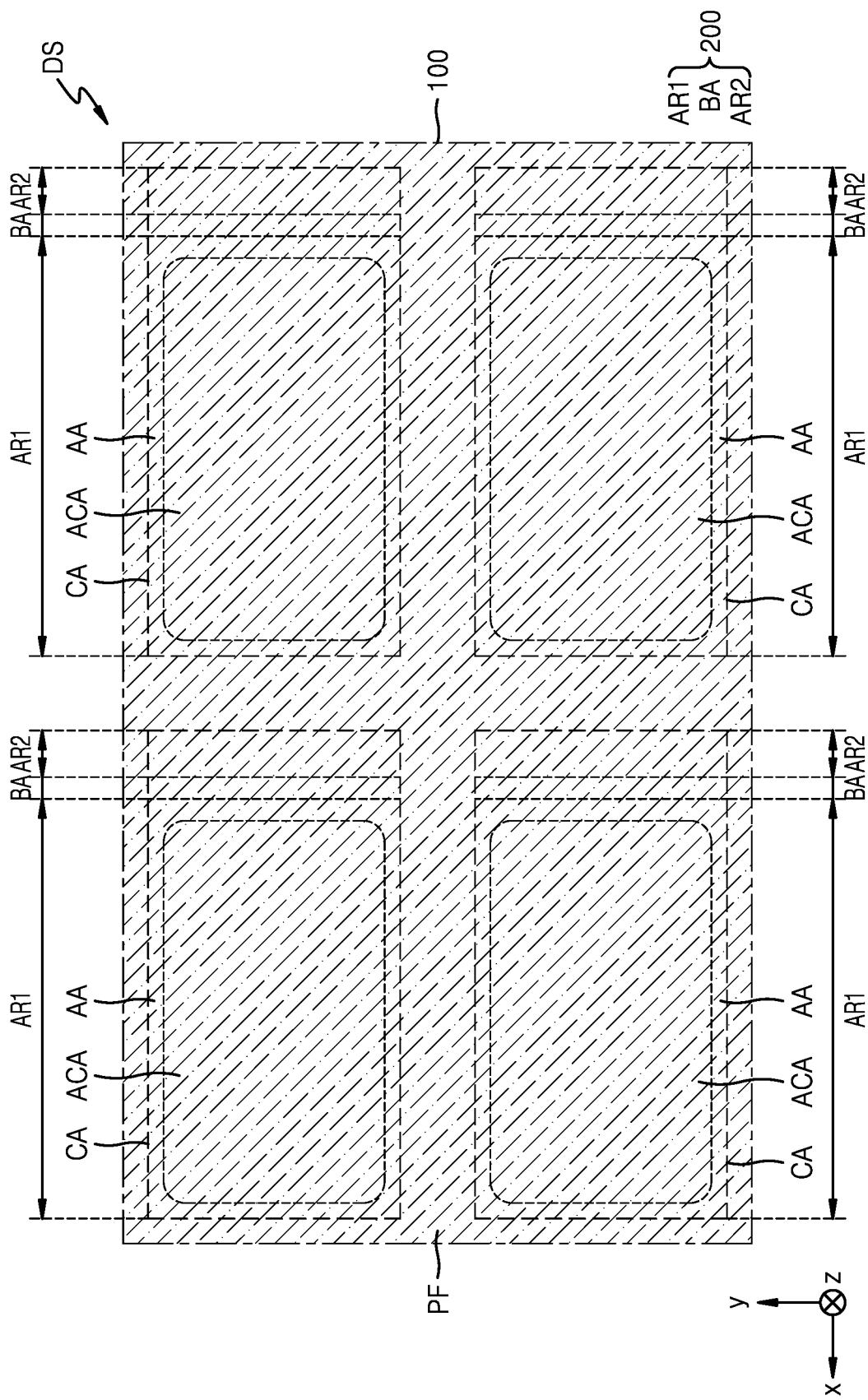

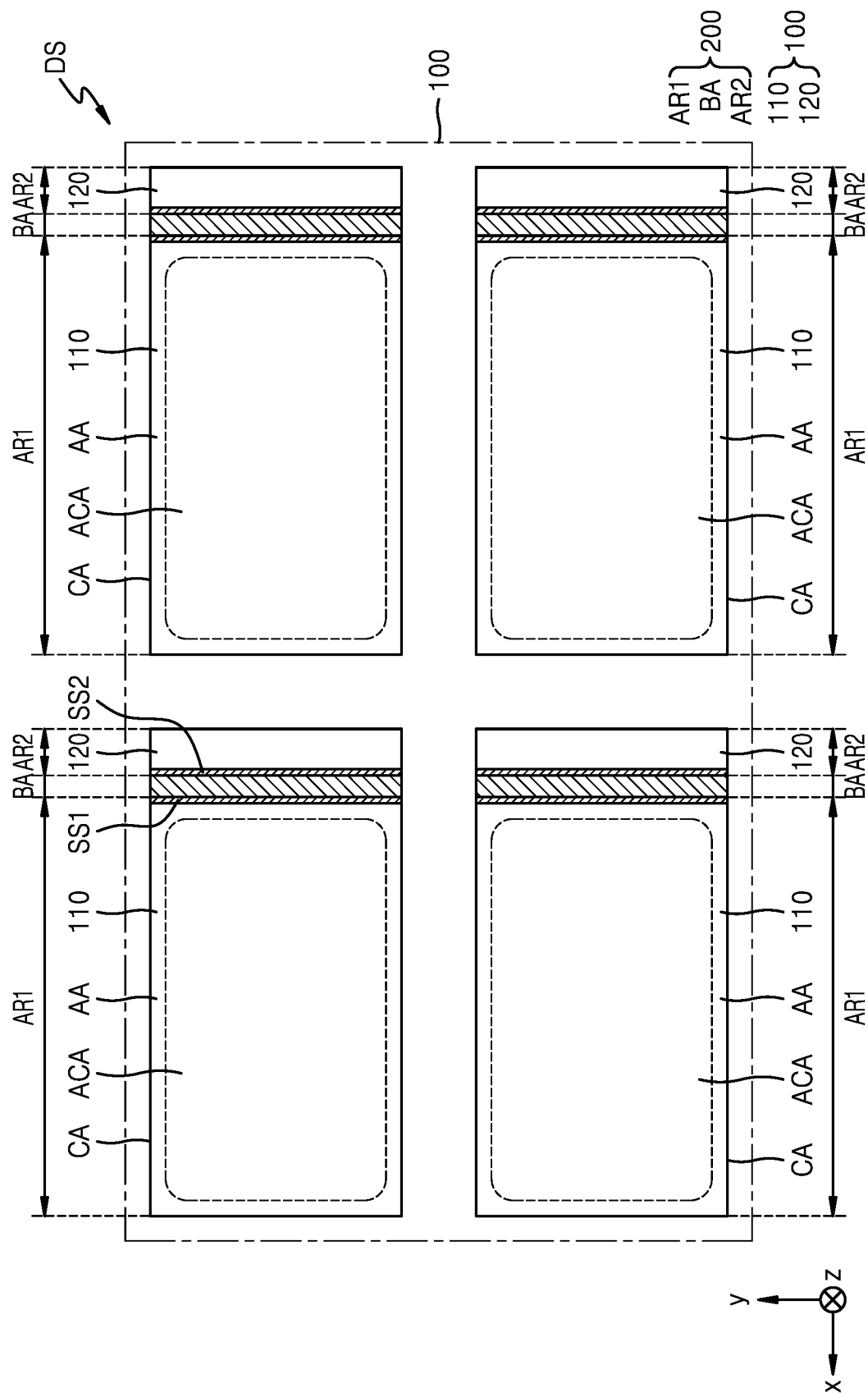

DISPLAY DEVICE INCLUDING GLASS SUBSTRATE PORTIONS WITH INCLINED SIDE SURFACES

This application claims priority to Korean Patent Application No. 10-2021-0139251, filed on Oct. 19, 2021, and all the benefits accruing therefrom under 35 U.S.C. § 119, the disclosure of which is incorporated by reference herein in its entirety.

BACKGROUND

1. Field

One or more embodiments relate to display devices and methods of manufacturing (or providing) the display devices.

2. Description of the Related Art

Electronic apparatuses have been widely used. Not only compact electronic apparatuses such as mobile phones, but also tablet personal computers, notebooks, and the like have been widely used as electronic apparatuses.

The electronic apparatuses may include display devices that support various functions and provide visual information such as images or videos to outside the electronic apparatuses. As other components for driving an electronic apparatus have been miniaturized, a portion occupied by a display device in an electronic apparatus has increased, and a structure to enable a display device in a flat state to be deformed or bent has been developed.

SUMMARY

A display device may have a structure in which various layers are stacked on a glass substrate. In this case, as the glass substrate has relatively high stiffness, bending of such a display device may be difficult.

Provided are display devices including a glass substrate, which may be deformable or bendable in various shapes and may have increased reliability, and methods of manufacturing (or providing) the display devices.

Additional aspects will be set forth in part in the description which follows and, in part, will be apparent from the description, or may be learned by practice of the presented embodiments of the disclosure.

According to an embodiment of the disclosure, a display device includes a first glass substrate including a first side surface which is partially inclined, a second glass substrate including a second side surface which is partially inclined, the second glass substrate being apart from the first glass substrate, a display layer including a first area on the first glass substrate, a light-emitting device in the first area, a bending area extending from the first area, and a second area extending from the bending area and on the second glass substrate, and an encapsulation layer on the display layer, the encapsulation layer including an inorganic encapsulation layer and an organic encapsulation layer. Each of the first side surface and the second side surface is adjacent to the bending area.

In an embodiment, the first glass substrate may further include a first surface facing the display layer and connected to the first side surface at a first position, and a second surface opposite to the first surface and connected to the first side surface at a second position. The first position may be closer to the bending area than the second position.

In an embodiment, the second glass substrate may further include a third surface facing the display layer and connected to the second side surface at a third position, and a fourth surface opposite to the third surface and connected to the second side surface at a fourth position. The third position may be closer to the bending area than the fourth position.

In an embodiment, the surface roughness of the first side surface may be less than the surface roughness of the first surface.

In an embodiment, the length of the first side surface in a length direction of the first glass substrate may have a range of about 30 micrometers (μm) to about 500 μm.

In an embodiment, the display layer may further include a pad electrode in the second area, and a connection wiring electrically connected to the pad electrode and extending from the second area to the first area.

In an embodiment, the display layer may further include a first organic material layer overlapping the bending area, and a second organic material layer overlapping the bending area and on the first organic material layer. The connection wiring is between the first organic material layer and the second organic material layer.

In an embodiment, the display device may further include a touch sensor layer on the encapsulation layer and including a touch electrode and a touch wiring. The touch wiring is electrically connected to the connection wiring.

In an embodiment, the bending area may be in a bent state.

In an embodiment, the display device may further include a glass member in the bending area, and a thickness of the glass member may be less than a thickness of the first glass substrate.

In an embodiment, the display device may further include an adhesive member below the first glass substrate.

In an embodiment, the display device may further include an organic protection layer in the bending area, where the organic protection layer may extend between the first glass substrate and the display layer and overlap the light-emitting device.

In an embodiment, the display device may further include an organic protection layer in the bending area, extending to the first glass substrate, and including a protection layer side surface which is inclined. The display layer may further include an inorganic insulating layer on the first glass substrate and covering the protection layer side surface.

In an embodiment, the display device may further include a filling layer between the first glass substrate and the second glass substrate.

In an embodiment, the light-emitting device may include an organic light-emitting diode.

According to an embodiment of the disclosure, a method of manufacturing (or providing) a display device include preparing a display substrate including a glass substrate, a display layer on the glass substrate and including a light-emitting device, and an encapsulation layer on the display layer and including an inorganic encapsulation layer and an organic encapsulation layer, and exposing a bending area of the display layer by etching the glass substrate. The glass substrate which is etched includes a first glass substrate including a partially inclined first side surface, and a second glass substrate including a partially inclined second side surface. The first side surface and the second side surface are adjacent to the bending area which is exposed.

In an embodiment, the exposing of the bending area of the display layer by etching the glass substrate includes providing a first protection film on the encapsulation layer and providing a second protection film below the glass substrate, removing part of the second protection film overlapping the bending area, etching the glass substrate overlapping the bending area, and removing the first protection film and the second protection film.

In an embodiment, a first adhesive layer may be between the first protection film and the encapsulation layer, and a second adhesive layer may be between the second protection film and the glass substrate.

In an embodiment, the method may further include bending the display substrate at the bending area.

In an embodiment, the display layer may be provided in plural including a plurality of display layers respectively including a plurality of bending areas, and the method may further include separating the plurality of display layers from each other, after the plurality of bending areas are exposed to outside the glass substrate.

BRIEF DESCRIPTION OF THE DRAWINGS

The above and other aspects, features, and advantages of embodiments of the disclosure will be more apparent from the following description taken in conjunction with the accompanying drawings, in which:

FIGS. 14A to 14F are schematic plan views showing a method of manufacturing the display device according to an embodiment.

DETAILED DESCRIPTION

Figure 1:
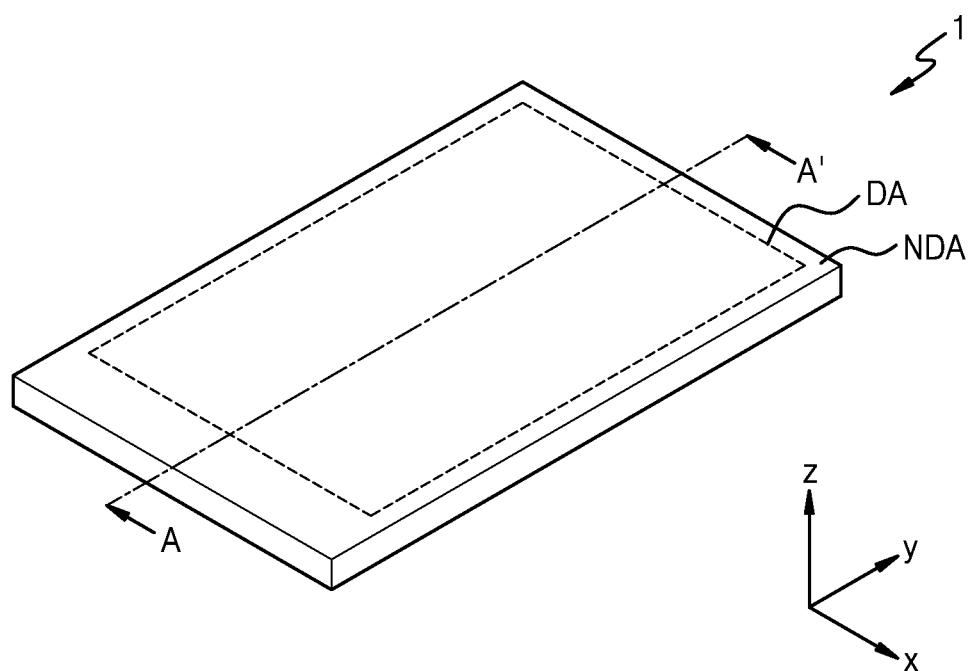
FIG. 1 is a schematic perspective view of a display device according to an embodiment.

Reference will now be made in detail to embodiments, examples of which are illustrated in the accompanying drawings, where like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof. For example, "an element" has the same meaning as "at least one element," unless the context clearly indicates otherwise. "At least one" is not to be construed as limiting "a" or "an." "Or" means "and/or."

The disclosure may, however, be embodied in many different forms and should not be construed as being limited to the embodiments set forth herein. Advantages and features of the disclosure and methods of accomplishing the same may be understood more readily by reference to the following detailed description of embodiments and the accompanying drawings. Rather, these embodiments are provided so that this disclosure will be thorough and complete and will fully convey the concept of the disclosure to those skilled in the art, and the disclosure will only be defined by the appended claims.

In embodiments, well-known processes, well-known structures and well-known technologies will not be specifically described in order to avoid ambiguous interpretation of the disclosure. Like reference numerals refer to like elements throughout the specification. As used herein, a reference number may indicate a singular element or a plurality of the element. For example, a reference number labeling a singular form of an element within the drawing figures may be used to reference a plurality of the singular element within the text of specification.

In the following embodiment, while such terms as "first," "second," etc., may be used to describe various components, such components must not be limited to the above terms. The above terms are used only to distinguish one component from another.

The terminology used herein is for the purpose of describing particular embodiments only and is not intended to be limiting. In the following embodiment, the singular forms "a," "an" and "the" are intended to include the plural forms as well, unless the context clearly indicates otherwise.

In the following embodiment, it will be further understood that the terms "comprises" and/or "comprising" used herein specify the presence of stated features or components, but do not preclude the presence or addition of one or more other features or components.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

In the following embodiment, it will be understood that when a layer, region, or component is referred to as being related to another element such as being "on" another layer, region, or component, it can be directly or indirectly on the other layer, region, or component. That is, for example, intervening layers, regions, or components may be present. In contrast, when a layer, region, or component is referred to as being related to another element such as being "directly on" another layer, region, or component, no intervening layers, regions, or components are present.

Sizes of components in the drawings may be exaggerated for convenience of explanation. For example, since sizes and thicknesses of components in the drawings are arbitrarily illustrated for convenience of explanation, the following embodiments are not limited thereto.

When an embodiment may be implemented differently, a specific process order may be performed differently from the described order. For example, two consecutively described processes may be performed substantially at the same time or performed in an order opposite to the described order.

In the following embodiment, it will be understood that when a layer, region, or component is referred to as being "connected to" another layer, region, or component, it can be directly connected to the other layer, region, or component or indirectly connected to the other layer, region, or component via intervening layers, regions, or components. For example, in the specification, when a layer, region, or component is referred to as being electrically connected to another layer, region, or component, it can be directly electrically connected to the other layer, region, or component or indirectly electrically connected to the other layer, region, or component via intervening layers, regions, or components.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A display device 1 is a device that displays an image, and may be included in portable electronic apparatuses such as game machines, multimedia devices, or ultracompact personal computers. Display devices may include liquid crystal display devices, electrophoretic display devices, organic light-emitting display devices, inorganic light-emitting display devices, field emission display devices, surface-conduction electron-emitter display devices, quantum dot display devices, plasma display device, cathode ray display devices, and the like. In the following description, an organic light-emitting display device is described as an example of a display device 1 according to an embodiment, but display devices of the above-described various types may be used as embodiments.

Figure 2:
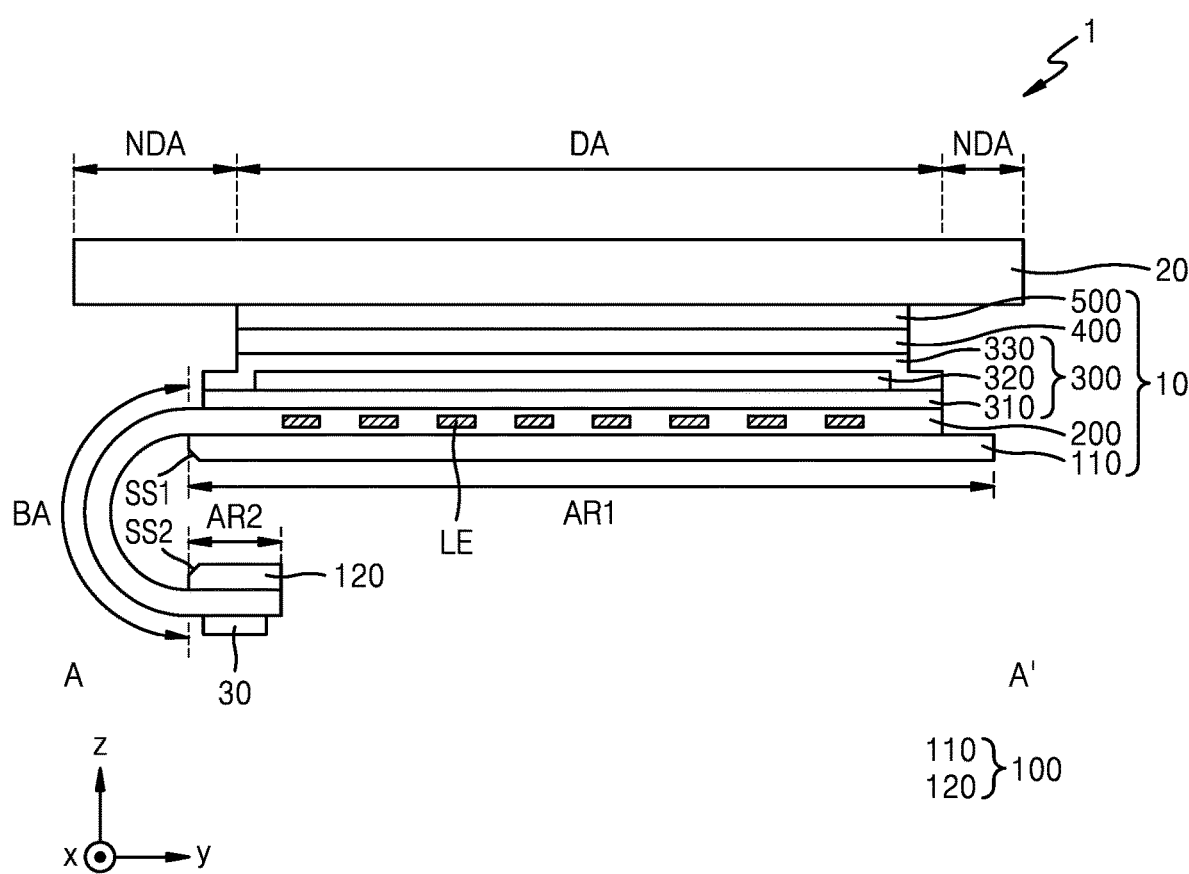
FIG. 2 is a schematic cross-sectional view taken along line A-A' of the display device of FIG. 1.

FIG. 1 is a schematic perspective view of a display device 1 according to an embodiment. FIG. 2 is a schematic cross-sectional view taken along line A-A', showing the display device 1 of FIG. 1.

Referring to FIG. 1, the display device 1 may display an image. The display device 1 may include a display area DA and a non-display area NDA. A plurality of pixels may be disposed in the display area DA, and the display device 1 may provide an image by using light emitted from the pixels. The non-display area NDA may be adjacent to the display area DA. The non-display area NDA may at least partially surround the display area DA. In an embodiment, the non-display area NDA may entirely surround the display area DA.

Referring to FIG. 2, the display device 1 may include a display panel 10, a cover window 20, and a display driving unit 30. The display panel 10 may emit light. The display panel 10 may include a glass substrate 100, a display layer 200, an encapsulation layer 300, a touch sensor layer 400, and an optical functional layer 500.

The glass substrate 100 may include glass. The glass substrate 100 may be a support substrate having high stiffness. The glass substrate 100 may include a first glass substrate 110 and a second glass substrate 120. The first glass substrate 110 may be a first support substrate having high stiffness, and the second glass substrate 120 may be a second support substrate having high stiffness. The first glass substrate 110 and the second glass substrate 120 may be disposed apart from each other (e.g., disconnected from each other).

The first glass substrate 110 may include a first side surface SS1 that is at least partially inclined as including an inclined portion. As the first glass substrate 110 includes the first side surface SS1 that is at least partially inclined, the strength of the first glass substrate 110 may be increased so as to absorb shock even when an external shock is applied thereto. The second glass substrate 120 may include a second side surface SS2 that is at least partially inclined. As the second glass substrate 120 includes the second side surface SS2 that is at least partially inclined, the strength of the second glass substrate 120 may be increased so as to absorb shock even when an external shock is applied thereto.

The display layer 200 may be disposed on the glass substrate 100. In an embodiment, the display layer 200 may include a light-emitting device LE, a pixel circuit PC for driving the light-emitting device LE and connected thereto, and wirings such as a signal line connected to the pixel circuit PC, and the like. The display layer 200 may have stiffness that is relatively lower than that of the glass substrate 100. Accordingly, the display layer 200 is easily bendable.

The display layer 200 may include a first area AR1, a bending area BA, and a second area AR2. The first area AR1 may be disposed on the first glass substrate 110. The first area AR1 may be a flat area. The light-emitting device LE may be disposed in the first area AR1. In an embodiment, an area of the first area AR1 where the light-emitting device LE is disposed may be the display area DA of the display device 1. The light-emitting device LE may implement a pixel PX. The light-emitting device LE may include an organic light-emitting diode, an inorganic light-emitting diode, a quantum-dot light-emitting diode, or the like. In the following description, a case in which the light-emitting device LE includes an organic light-emitting diode is mainly described in detail.

As the display layer 200 is disposed on the first glass substrate 110, the display layer 200 may be disposed to be flat in the first area AR1. When a substrate including an organic material is used instead of the glass substrate 100, as the area of the substrate increases, the substrate may have flexion or surface waveform (waviness). In an embodiment, for example, when the display device 1 is included in a television (TV) or a notebook computer, such flexion or surface waveform may be increased. In the present embodiment, as the display layer 200 is disposed on the first glass substrate 110 that is flat, such flexion or surface waveform may be prevented or reduced from being increased.

The bending area BA may extend from the first area AR1. In an embodiment, the bending area BA may be bendable to be bent within the display device 1. In an embodiment, for example, the bending area BA may be an area that is bendable around an axis extending in an x direction of FIG. 2. The glass substrate 100 may not be disposed in the bending area BA. Accordingly, the flexibility of the bending area BA may be increased.

The second area AR2 may extend from the bending area BA. The second area AR2 may be disposed on the second glass substrate 120. The second area AR2 may be a flat area. In an embodiment, the second area AR2 maybe a pad area. In this case, the display driving unit 30 may be disposed in the second area AR2. In an embodiment, the second area AR2 may be a portion of the display area DA, and the light-emitting device LE may be disposed in the second area AR2. In the following description, a case in which the second area AR2 is a pad area is mainly described in detail.

In an embodiment, the display device 1 which is bent at the bending area BA (e.g., in the bent state) may dispose the first side surface SS1 and the second side surface SS2 adjacent to the bending area BA. In an embodiment, the display device 1 which is bent disposes the first side surface SS1 and the second side surface SS2 facing in a same direction. The first side surface SS1 and the second side surface SS2 may be surfaces that are formed (or provided) when at least part of the glass substrate 100 is etched.

The encapsulation layer 300 may be disposed on the display layer 200. The encapsulation layer 300 may cover the light-emitting device LE. Accordingly, infiltration of external foreign materials or moisture into the light-emitting device LE may be prevented or reduced. In an embodiment, the encapsulation layer 300 may be disposed in the first area AR1. The encapsulation layer 300 may not be disposed in the bending area BA (e.g., may be excluded from, adjacent to or spaced apart from the bending area BA). The encapsulation layer 300 may include at least one inorganic encapsulation layer and at least one organic encapsulation layer, which are alternately stacked. The at least one inorganic encapsulation layer may include one or more inorganic materials of aluminum oxide ($Al_2O_3$), titanium oxide ($TiO_2$), tantalum oxide ($Ta_2O_5$), zinc oxide ($ZnO_x$), silicon oxide ($SiO_x$), silicon nitride ($SiN_x$), silicon oxynitride (SiON). $ZnO_x$ may include oxide zinc (ZnO) and/or peroxide zinc ($ZnO_2$). The at least one organic encapsulation layer may include a polymer-based material. The polymer-based material may include acrylic resin, epoxy-based resin, polyimide, polyethylene, and the like. In an embodiment, the at least one organic encapsulation layer may include acrylate.

FIG. 2 illustrates a case in which the encapsulation layer 300 includes a first inorganic encapsulation layer 310, an organic encapsulation layer 320, and a second inorganic encapsulation layer 330. The first inorganic encapsulation layer 310 may be disposed on the display layer 200, the organic encapsulation layer 320 may be disposed on the first inorganic encapsulation layer 310, and the second inorganic encapsulation layer 330 may be disposed on the organic encapsulation layer 320. The first inorganic encapsulation layer 310 and the second inorganic encapsulation layer 330 may not be disposed in the bending area BA. Accordingly, the flexibility of the bending area BA may be increased.

Unlike the present embodiment, the display layer 200 may be sealed by using a sealing substrate (not shown) including glass. A sealing member (not shown) may be disposed between the glass substrate 100 and the sealing substrate to overlap the non-display area NDA. When a shock is applied to the display device 1 including the sealing substrate, the sealing member and the glass substrate 100 may be separated from each other, or the sealing member and the sealing substrate may be separated from each other. Accordingly, the reliability of the display device 1 may be low. According to the present embodiment, as the encapsulation layer 300 of the display device 1 includes at least one inorganic encapsulation layer and at least one organic encapsulation layer, the strength of the display device 1 may be increased.

The touch sensor layer 400 may be disposed on the encapsulation layer 300. The touch sensor layer 400 may sense an external input, for example, coordinate information according to a touch, proximity, pressure, etc. event. The touch sensor layer 400 may include a touch electrode and touch wirings which are connected to the touch electrode. The touch sensor layer 400 may sense an external input by a self-capacitance method or a mutual capacitance method.

The touch sensor layer 400 may be formed on the encapsulation layer 300. Alternatively, the touch sensor layer 400 may be separately formed on a touch substrate (not shown) and then may be coupled to the encapsulation layer 300 via an adhesive layer (not shown) such as an optical clear adhesive. In an embodiment, the touch sensor layer 400 may be formed directly on the encapsulation layer 300. In this case, the adhesive layer may not be provided between the touch sensor layer 400 and the encapsulation layer 300.

The optical functional layer 500 may be disposed on the touch sensor layer 400. The optical functional layer 500 may reduce the reflectivity of light, for example, external light, that is externally input toward the display device 1 from outside thereof. The optical functional layer 500 may improve the color purity of light emitted from the display device 1. In an embodiment, the optical functional layer 500 may include a retarder and a polarizer. The retarder may be of a film type or a liquid crystal coating type, and may include a $\lambda/2$ retarder and/or a $\lambda/4$ retarder. The polarizer may also be of a film type or a liquid crystal coating type. A film type polarizer may include a stretch type synthesis resin film, and a liquid crystal coating type polarizer may include liquid crystals oriented in an array. The retarder and the polarizer may further include a protection film PF.

In an embodiment, the optical functional layer 500 may include a black matrix and color filters. The color filters may be disposed considering the color of light emitted from each of a plurality of pixels of the display device 1. Each of the color filters may include red, green, or blue pigment or dye. Alternatively, each of the color filters may further include quantum dots in addition to the above-described pigment or dye. Alternatively, a portion of the color filters may not include the above-described pigment or dye, and may include scattering particles such as titanium oxide.

In an embodiment, the optical functional layer 500 may further include a destructive interference structure. The destructive interference structure may include a first reflective layer and a second reflective layer that are disposed on different layers. First reflected light and second reflected light respectively reflected from the first reflective layer and the second reflective layer may destructively interfere, and accordingly the reflectivity of external light may be reduced.

The cover window 20 may be disposed on the display panel 10. The cover window 20 may protect the display panel 10. The cover window 20 may include at least one of glass, sapphire, or plastic. The cover window 20 may include, for example, ultra-thin glass or colorless polyimide.

The display driving unit 30 may be disposed in the second area AR2. The display driving unit 30 may generate and output signals and voltages to drive the display panel 10. The display driving unit 30 may include an integrated circuit (IC). The display driving unit 30 may be electrically connected to the display panel 10 by an anisotropic conductive film.

In embodiments, a printed circuit board may be disposed in the second area AR2. The display circuit board may include a flexible printed circuit board (FPCB) that is bendable or a rigid printed circuit board (PCB) that is rigid and is not bendable. Alternatively, in cases, the display circuit board may include a composite printed circuit board including both of the rigid printed circuit board and the flexible printed circuit board. An integrated circuit may be disposed on the printed circuit board.

Figure 3:
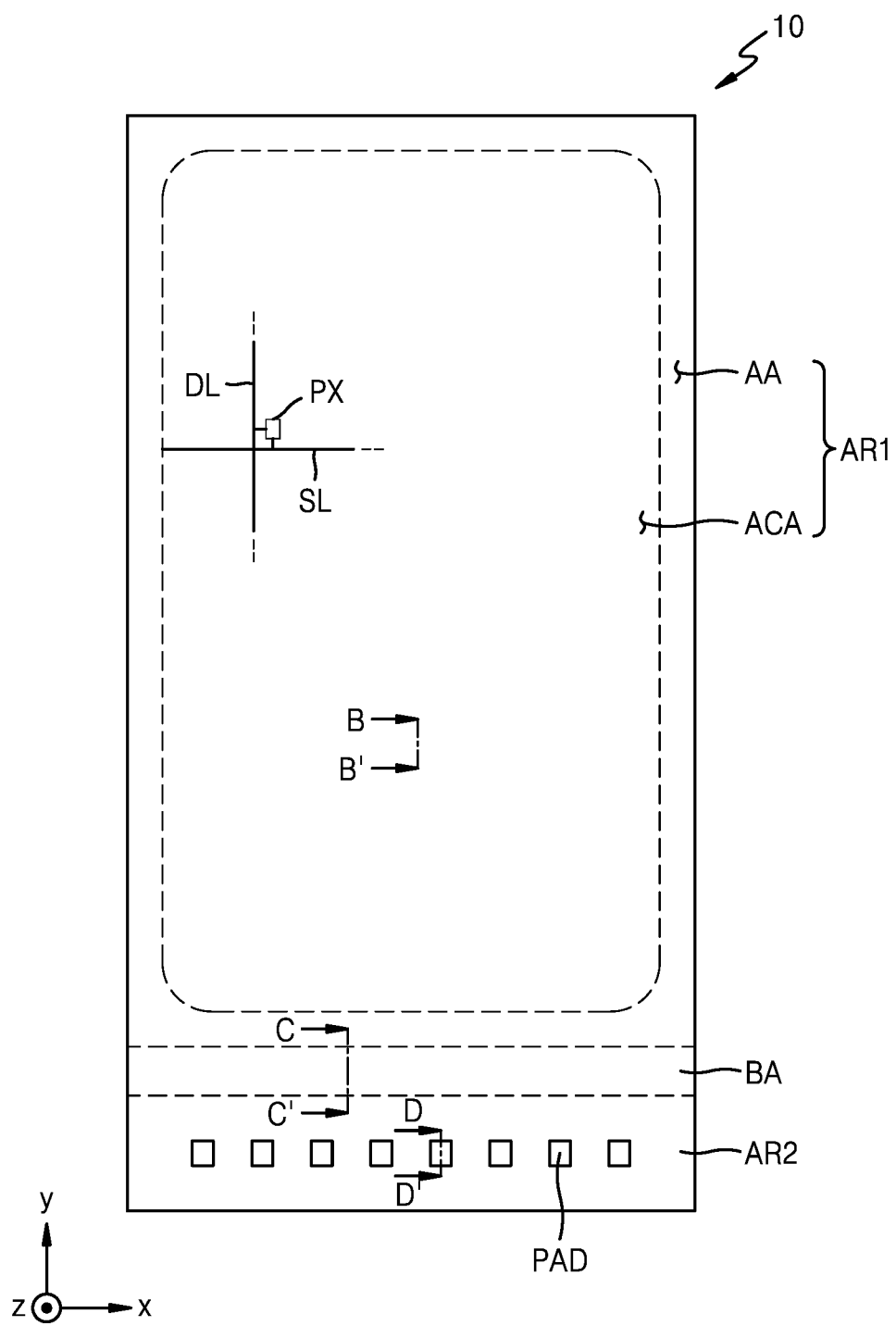
FIG. 3 is a schematic plan view of a display panel according to an embodiment.

FIG. 3 is a schematic plan view of the display panel 10 according to an embodiment. FIG. 3 is a plan view showing the display panel 10 which is unbent.

Referring to FIG. 3, the display panel 10 may include the first glass substrate 110, the second glass substrate 120, and the display layer 200. The display layer 200 may include the first area AR1, the bending area BA, and the second area AR2. The first area AR1 may include an active area ACA and an adjacent area AA. A pixel PX may be disposed in the active area ACA. The pixel PX may be connected to a scan line SL extending in a first direction, for example, an x direction, and a data line DL extending in a second direction, for example, a y direction. The active area ACA may be a display area DA. The adjacent area AA may be disposed adjacent to the active area ACA. In an embodiment, the adjacent area AA may at least partially surround the active area ACA. In an embodiment, the adjacent area AA may surround an entirety of the active area ACA. A scan driver for applying a scan signal Sn to the scan line SL, a data driver for applying a data signal Dm to the data line DL, and a power wiring configured to apply a power voltage to the pixel PX may be disposed in the adjacent area AA. The adjacent area AA may be a non-display area.

The bending area BA may extend from the first area AR1. In an embodiment, the bending area BA may extend from the adjacent area AA. The bending area BA may be an area where the display panel 10 is bendable.

The second area AR2 may extend from the bending area BA. In an embodiment, the second area AR2 may be a pad area. In an embodiment, for example, a pad PAD may be disposed in the second area AR2. The pad PAD may be connected to, for example, the display driving unit 30. In an embodiment, a wiring connected to the pad PAD may extend from the second area AR2 to the first area AR1. Accordingly, the signal or power voltage received from the pad PAD may be transmitted to the pixel PX disposed in the active area ACA.

The first glass substrate 110 may overlap (or correspond to) the first area AR1, and the second glass substrate 120 may overlap (or correspond to) the second area AR2. The first glass substrate 110 and the second glass substrate 120 may be disposed apart from each other with the bending area BA therebetween. Accordingly, the display panel 10 may be flexible in the bending area BA. When the second area AR2 is a pad area, the second area AR2 may be a non-display area. The display device 1 which is bent at the bending area BA may reduce the size of a non-display area that is recognizable from outside the display device 1, such as by a user.

Figure 4:
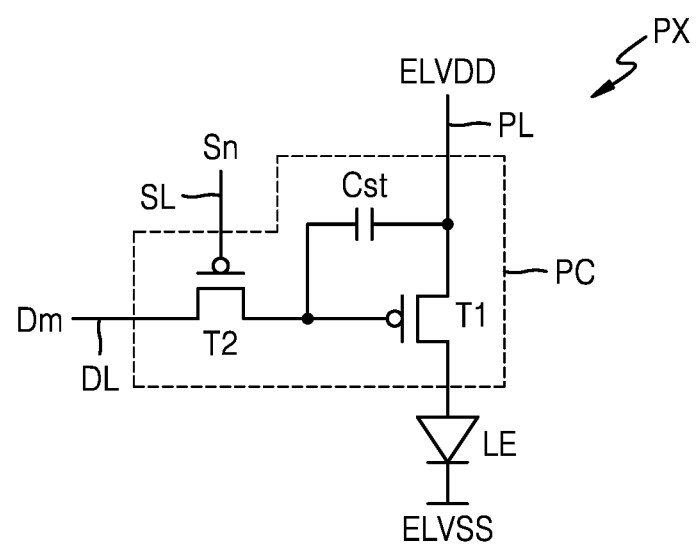
FIG. 4 is a schematic equivalent circuit diagram of any one pixel of a display panel according to an embodiment.

FIG. 4 is a schematic equivalent circuit diagram of any one pixel PX of the display panel 10.

Referring to FIG. 4, the pixel PX may include a pixel circuit PC and the light-emitting device LE which is electrically connected to the pixel circuit PC. In an embodiment, the pixel circuit PC may include a driving thin film transistor T1, a switching thin film transistor T2, and a storage capacitor Cst.

The switching thin film transistor T2 may be connected to the scan line SL and the data line DL, and may transmit a data signal Dm input through the data line DL to the driving thin film transistor T1, in response to a scan signal Sn input through the scan line SL.

The storage capacitor Cst may be connected to the switching thin film transistor T2 and a driving voltage line PL, and may store a voltage corresponding to a difference between a voltage received from the switching thin film transistor T2 and a first power voltage ELVDD supplied through the driving voltage line PL.

The driving thin film transistor T1 may be connected to the driving voltage line PL and the storage capacitor Cst, and may control a driving (electrical) current flowing from the driving voltage line PL to the light-emitting device LE, in response to a voltage value stored in the storage capacitor Cst. The light-emitting device LE may emit light having a luminance due to the driving current. A counter electrode 223, for example, a cathode, of the light-emitting device LE may receive a second power voltage ELVSS.

Although FIG. 4 illustrates that the pixel circuit PC includes two transistors and one storage capacitor, in an embodiment, the pixel circuit PC may include three or more transistors.

Figure 5A:
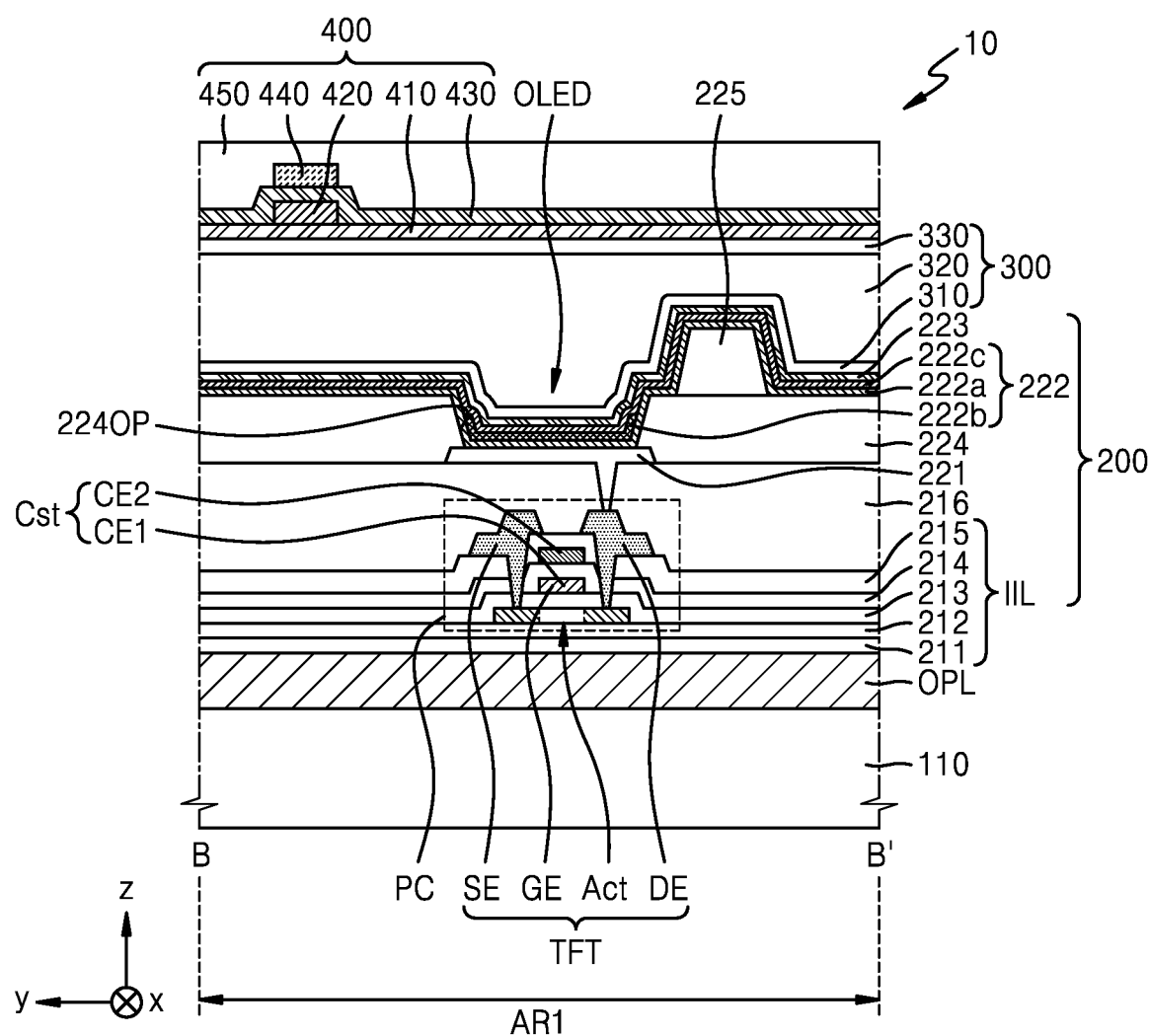
FIG. 5A is a schematic cross-sectional view taken along line B-B' of FIG. 3, showing a display panel according to an embodiment.

FIG. 5A is a schematic cross-sectional view taken along line B-B' of FIG. 3, showing the display panel 10 according to an embodiment.

Referring to FIG. 5A, the display panel 10 may include the first glass substrate 110, an organic protection layer OPL, the display layer 200, the encapsulation layer 300, and the touch sensor layer 400. The display layer 200 may be disposed on the first glass substrate 110. The first area AR1 of the display layer 200 may be disposed on the first glass substrate 110.

The organic protection layer OPL may be disposed between the first glass substrate 110 and the display layer 200. The organic protection layer OPL may extend between the first glass substrate 110 and the display layer 200 and overlap an organic light-emitting diode OLED as the light-emitting device LE. The organic protection layer OPL may include polymer resin such as polyethersulfone, polyarylate, polyetherimide, polyethylene naphthalate, polyethylene terephthalate, polyphenylene sulfide, polyimide, polycarbonate, cellulose triacetate, cellulose acetate propionate, and the like.

The display layer 200 may include an inorganic insulating layer IIL, the pixel circuit PC, an organic insulating layer 216, the organic light-emitting diode OLED, a pixel defining layer 224, and a spacer 225. The inorganic insulating layer IIL may include a barrier layer 211, a buffer layer 212, a first gate insulating layer 213, a second gate insulating layer 214, and an interlayer insulating layer 215.

The barrier layer 211 may be disposed above the first glass substrate 110. In an embodiment, the barrier layer 211 may be disposed on the organic protection layer OPL. The barrier layer 211 may be a layer to prevent or reduce infiltration of external foreign materials. The barrier layer 211 may be a single layer or a multilayer including an inorganic material such as $SiN_x$, $SiO_2$, and/or SiON.

The buffer layer 212 may be disposed on the barrier layer 211. The buffer layer 212 may include an inorganic insulating material such as $SiN_x$, SiON, and $SiO_2$, and may be a single layer or a multilayer including the above inorganic insulating material.

The pixel circuit PC may be disposed on the buffer layer 212. The pixel circuit PC may include a thin film transistor TFT and the storage capacitor Cst. In an embodiment, the thin film transistor TFT may include a semiconductor layer Act, a gate electrode GE, a source electrode SE, and a drain electrode DE. The storage capacitor Cst may include a lower electrode CE1 and an upper electrode CE2.

The semiconductor layer Act may be disposed on the buffer layer 212. The semiconductor layer Act may include poly silicon. Alternatively, the semiconductor layer Act may include amorphous silicon, an oxide semiconductor, an organic semiconductor, and the like. In an embodiment, the semiconductor layer Act may include a channel region and a source region and a drain region that are disposed at opposite sides of the channel region.

The first gate insulating layer 213 may be disposed on the semiconductor layer Act and the buffer layer 212. The first gate insulating layer 213 may include an inorganic insulating material such as $SiO_2$, $SiN_x$, SiON, $Al_2O_3$, $TiO_2$, $Ta_2O_5$, a hafnium oxide ($HfO_2$), $ZnO_x$, or the like. $ZnO_x$ may include ZnO and/or $ZnO_2$.

The gate electrode GE may be disposed on the first gate insulating layer 213. The gate electrode GE may overlap the channel region of the semiconductor layer Act. The gate electrode GE may include a low-resistance metal material. In an embodiment, the gate electrode GE may include a conductive material including molybdenum (Mo), aluminum (Al), copper (Cu), titanium (Ti), and the like, and may be provided as a single layer or a multilayer including the above materials.

The second gate insulating layer 214 may be disposed on the gate electrode GE and the first gate insulating layer 213. The second gate insulating layer 214 may include an inorganic insulating material such as $SiO_2$, $SiN_x$, SiON, $Al_2O_3$, $TiO_2$, $Ta_2O_5$, $HfO_2$, $ZnO_x$, or the like.

The upper electrode CE2 may be disposed on the second gate insulating layer 214. The upper electrode CE2 may overlap the gate electrode GE. In this case, the gate electrode GE may function as the lower electrode CE1 of the storage capacitor Cst. Although FIG. 5A illustrates that the storage capacitor Cst and the thin film transistor TFT overlap each other, in an embodiment, the storage capacitor Cst and the thin film transistor TFT may not overlap each other. In this case, the lower electrode CE1 and the gate electrode GE may be separate electrodes. The upper electrode CE2 may include Al, platinum (Pt), palladium (Pd), silver (Ag), magnesium (Mg), gold (Au), nickel (Ni), neodymium (Nd), iridium (Ir), chromium (Cr), calcium (Ca), Mo, Ti, tungsten (W), and/or Cu, and may be a single layer or a multilayer of the above-described materials.

The interlayer insulating layer 215 may be disposed on the upper electrode CE2 and the second gate insulating layer 214. The interlayer insulating layer 215 may include an inorganic insulating material such as $SiO_2$, $SiN_x$, SiON, $Al_2O_3$, $TiO_2$, $Ta_2O_5$, $HfO_2$, $ZnO_x$, or the like.

The source electrode SE and the drain electrode DE may be disposed on the interlayer insulating layer 215. The source electrode SE and the drain electrode DE may each be connected to the semiconductor layer Act via a contact hole provided in the first gate insulating layer 213, the second gate insulating layer 214, and the interlayer insulating layer 215. At least one of the source electrode SE and the drain electrode DE may include a conductive material including Mo, Al, Cu, Ti, or the like, and may be provided as a single layer or a multilayer including the above materials. In an embodiment, at least one of the source electrode SE or the drain electrode DE may have a multilayer structure of Ti/Al/Ti.

The organic insulating layer 216 may be disposed on the source electrode SE, the drain electrode DE, and the interlayer insulating layer 215. The organic insulating layer 216 may include an organic material. The organic insulating layer 216 may include an organic insulating material such as general purpose polymers such as polymethylmethacrylate (PMMA) or polystyrene (PS), polymer derivatives having a phenolic group, acrylic polymer, imide-based polymer, arylether-based polymer, amide-based polymer, fluorine-based polymer, p-xylene-based polymer, vinyl alcohol-based polymer, and blends thereof.

The light-emitting device LE may be disposed on the organic insulating layer 216. In an embodiment, the light-emitting device LE may include the organic light-emitting diode OLED. The organic light-emitting diode OLED may include a pixel electrode 221, an intermediate layer 222, and a counter electrode 223. The pixel electrode 221 may include a conductive oxide such as indium tin oxide (ITO), indium zinc oxide (IZO), ZnO, indium oxide ($In_2O_3$), indium gallium oxide (IGO), or aluminum zinc oxide (AZO). In an embodiment, the pixel electrode 221 may include a reflective film including Ag, Mg, Al, Pt, Pd, Au, Ni, Nd, Ir, Cr, or a compound thereof. In an embodiment, the pixel electrode 221 may further include a film formed of ITO, IZO, ZnO, or $In_2O_3$ above/below the above-described reflective film.

A pixel defining layer 224 may cover an edge of the pixel electrode 221. The pixel defining layer 224 may include a pixel opening portion 224OP, and the pixel opening portion 224OP may overlap the pixel electrode 221. The pixel opening portion 224OP may define a light-emitting area where light emitted is from the organic light-emitting diode OLED. The pixel defining layer 224 may include an organic insulating material and/or an inorganic insulating material. In embodiments, the pixel defining layer 224 may include a light blocking material.

The spacer 225 may be disposed on the pixel defining layer 224. The spacer 225 may be provided to prevent damage to a multilayer film on the first glass substrate 110 in a method of manufacturing (or providing) a display panel 10. A mask sheet may be used in the method of manufacturing the display panel 10. In this case, the mask sheet may enter or sag into the inside of the pixel opening portion 224OP of the pixel defining layer 224 or may adhere to the pixel defining layer 224. The spacer 225 may prevent or reduce defects in which a part of the multilayer film is damaged or broken by the mask sheet when a deposition material is deposited on the first glass substrate 110.

The spacer 225 may include an organic material such as polyimide. Alternatively, the spacer 225 may include an inorganic insulating material such as $SiN_x$ or $SiO_2$, or an organic insulating material and an inorganic insulating material. In an embodiment, the spacer 225 may include a material different from the pixel defining layer 224. Alternatively, in an embodiment, the spacer 225 may include the same material as a material of the pixel defining layer 224. In this case, the pixel defining layer 224 and the spacer 225 may be formed together in a mask process using a half tone mask and the like.

The intermediate layer 222 may be disposed on the pixel electrode 221 and the pixel defining layer 224. The intermediate layer 222 may include a light-emitting layer 222b. The light-emitting layer 222b may overlap the pixel electrode 221. The light-emitting layer 222b may include a polymer or a low molecular weight organic material that emits light of a color.

The intermediate layer 222 may further include at least one of a first functional layer 222a and a second functional layer 222c. The first functional layer 222a may be disposed between the pixel electrode 221 and the light-emitting layer 222b. The first functional layer 222a may include a hole transport layer (HTL) and/or a hole injection layer (HIL). The second functional layer 222c may be disposed between the light-emitting layer 222b and the counter electrode 223. The second functional layer 222c may include an electron transport layer (ETL) and/or an electron injection layer (EIL).

The counter electrode 223 may be disposed on the pixel electrode 221, the intermediate layer 222, and the pixel defining layer 224. The counter electrode 223 may include a conductive material having a low work function. For example, the counter electrode 223 may include a (semi-)transparent layer including Ag, Mg, Al, Pt, Pd, Au, Ni, Nd, Ir, Cr, lithium (Li), Ca, an alloy thereof, or the like. Alternatively, the counter electrode 223 may further include a layer such as ITO, IZO, ZnO, or $In_2O_3$ on the (semi-)transparent layer including the above-described material.

The encapsulation layer 300 may be disposed on the display layer 200. The encapsulation layer 300 may cover the organic light-emitting diode OLED. In an embodiment, the encapsulation layer 300 may include at least one inorganic encapsulation layer and at least one organic encapsulation layer. FIG. 5A illustrates that the encapsulation layer 300 includes the first inorganic encapsulation layer 310, the organic encapsulation layer 320, and the second inorganic encapsulation layer 330, which are sequentially stacked.

The touch sensor layer 400 may be disposed on the encapsulation layer 300. The touch sensor layer 400 may include a first touch insulating layer 410, a first touch conductive layer 420, a second touch insulating layer 430, a second touch conductive layer 440, and a third touch insulating layer 450 in order from the encapsulation layer 300. The first touch insulating layer 410 may be disposed on the second inorganic encapsulation layer 330. The first touch insulating layer 410 may be a single layer or multilayer including an inorganic material such as $SiN_x$, $SiO_x$, and/or SiON.

The first touch conductive layer 420 may be disposed on the first touch insulating layer 410. The first touch conductive layer 420 may include a conductive material, for example, a metal material. The first touch conductive layer 420 may include Mo, Al, Cu, Ti, and the like, and may be provided as a single layer or a multilayer including the above materials. In an embodiment, the first touch conductive layer 420 may have a multilayer structure of Ti/Al/Ti.

The second touch insulating layer 430 may be disposed on the first touch conductive layer 420 and the first touch insulating layer 410. The second touch insulating layer 430 may be a single layer or multilayer including an inorganic material such as $SiN_x$, $SiO_x$, and/or SiON.

The second touch conductive layer 440 may be disposed on the second touch insulating layer 430. The second touch conductive layer 440 may include a conductive material, for example, a metal material. The second touch conductive layer 440 may include Mo, Al, Cu, Ti, and the like, and may be provided as a single layer or a multilayer including the above materials. In an embodiment, the second touch conductive layer 440 may have a multilayer structure of Ti/Al/Ti.

The first touch conductive layer 420 and the second touch conductive layer 440 may include a plurality of touch electrodes for sensing a touch input as an external input. In an embodiment, the touch sensor layer 400 may include a plurality of first touch electrodes extending in the first direction, for example, the x direction, on a plan view, and a plurality of second touch electrodes extending in the second direction, for example, the y direction. The first touch electrodes and the second touch electrodes may sense a touch input in a mutual capacitance method. In an embodiment, the touch electrode may sense a touch input in a self-capacitance method.

The third touch insulating layer 450 may be disposed on the second touch conductive layer 440 and the second touch insulating layer 430. An upper surface of the third touch insulating layer 450 may be flat. The third touch insulating layer 450 may include an organic material. In an embodiment, for example, the third touch insulating layer 450 may include a polymer-based material. The above-described polymer-based material may be transparent. In an embodiment, for example, the third touch insulating layer 450 may include silicon-based resin, acrylic resin, epoxy-based resin, polyimide, polyethylene, and the like.

Figure 5B:
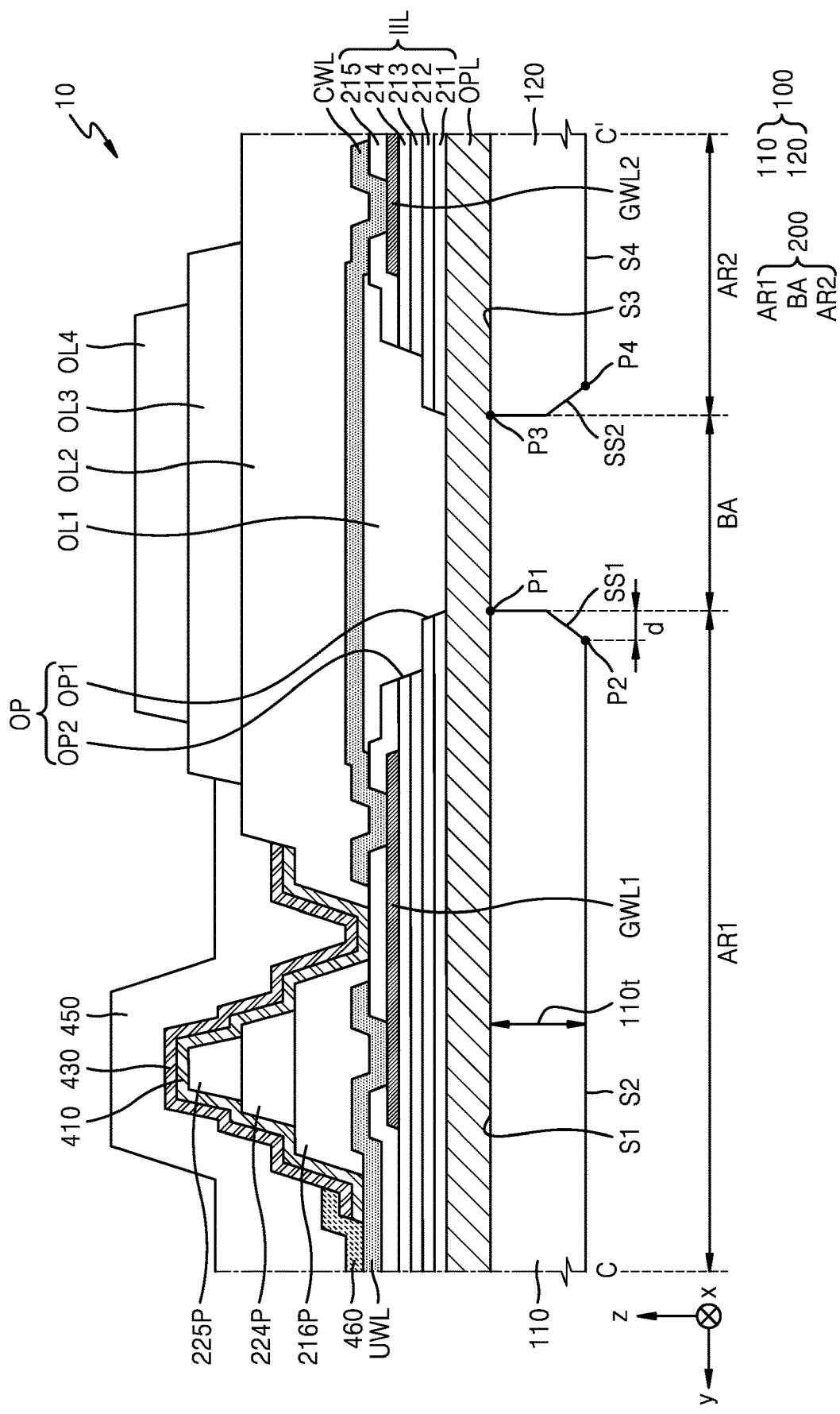
FIG. 5B is a schematic cross-sectional view taken along line C-C' of FIG. 3, showing a display panel according to an embodiment.

FIG. 5B is a schematic cross-sectional view taken along line C-C' of FIG. 3, showing the display panel 10 according to an embodiment. In FIGS. 5A and 5B, like reference numerals denote like elements, and thus, redundant descriptions thereof are omitted.

Referring to FIG. 5B, the display panel 10 may include the glass substrate 100, the display layer 200, the touch sensor layer 400, and the organic protection layer OPL. The glass substrate 100 may include the first glass substrate 110 and the second glass substrate 120. The first glass substrate 110 may include a first surface S1, a second surface S2, and the first side surface SS1. The first surface S1 may be a surface facing the display layer 200, such as being closest to the display layer 200. The first surface S1 may be flat. The first surface S1 may extend in the first direction, for example, the x direction, and/or the second direction, for example, the y direction, such as to be in a plane defined by the first direction and the second direction crossing each other. The second surface S2 may be a surface opposite to the first surface S1. The second surface S2 may be flat. The second surface S2 may extend in the first direction, for example, the x direction, and/or the second direction, for example, the y direction.

The first side surface SS1 may be connected to the first surface S1 at a first position P1. The first side surface SS1 may be connected to the second surface S2 at a second position P2. The first side surface SS1 may be at least partially inclined relative to the first surface S1 and/or the second surface S2. At least part of the first side surface SS1 may extend in a direction crossing a length direction of the first glass substrate 110, for example, the y direction, and a thickness direction of the first glass substrate 110, for example, a z direction. In an embodiment, the first side surface SS1 may include a vertical part extending in the thickness direction of the first glass substrate 110, for example, the z direction, together with an inclined part. In an embodiment, the first side surface SS1 may be inclined as a whole and have no vertical part.

The first position P1 may be closer to the display layer 200 than the second position P2. The first position P1 may be closer to the bending area BA than the second position P2. Accordingly, at least part of the first side surface SS1 may be a tapered surface of the first glass substrate 110. In an embodiment, a length d of the first side surface SS1 in the length direction of the first glass substrate 110, for example, the y direction, may have a range of about 30 micrometers (μm) to about 500 μm. In an embodiment, the length d of the first side surface SS1 in the length direction of the first glass substrate 110, for example, the y direction, may have a range of about 30 μm to about 350 μm. Along a width length direction, for example, the x direction, edges of the first glass substrate 110 may extend at various positions, such as at the first position P1, the second position P2 and at end positions defining the length d.

The surface roughness of the first side surface SS1 may be less than the surface roughness of the first surface S1. In an embodiment, the surface roughness may be a center line average roughness (Ra). The first side surface SS1 that is a surface formed by etching the glass substrate 100 may be smoother than the first surface S1 and/or the second surface S2. In this case, the strength of the display panel 10 may be increased. In embodiments, etching residue may remain on the first side surface SS1 and the second side surface SS2.

A thickness 110t of the first glass substrate 110 may be about 0.2 millimeter (mm). In an embodiment, the thickness 110t of the first glass substrate 110 may be greater than about 0.2 mm. In an embodiment, the thickness 110t of the first glass substrate 110 may be less than about 0.2 mm. The thickness 110t of the first glass substrate 110 may be a distance between the first surface S1 and the second surface S2, along a thickness direction (e.g., third direction or z direction).

The second glass substrate 120 may be apart from the first glass substrate 110, in a direction along the display layer 200. The second glass substrate 120 may include a third surface S3, a fourth surface S4, and the second side surface SS2. The third surface S3 may be a surface facing the display layer 200. The third surface S3 may be flat. The third surface S3 may extend in the first direction, for example, the x direction, and/or the second direction, for example, the y direction. The fourth surface S4 may be a surface opposite to the third surface S3. The fourth surface S4 may be flat. The fourth surface S4 may extend in the first direction, for example, the x direction, and/or the second direction, for example, the y direction.

The second side surface SS2 may be connected to the third surface S3 at a third position P3. The second side surface SS2 may be connected to the fourth surface S4 at a fourth position P4. The second side surface SS2 may be at least partially inclined. At least part of the second side surface SS2 may extend in a direction crossing the length direction of the second glass substrate 120, for example, the y direction, and the thickness direction of the second glass substrate 120, for example, the z direction. In an embodiment, the second side surface SS2 may include a vertical part extending in the thickness direction of the second glass substrate 120, for example, the z direction, together with an inclined part. In an embodiment, the second side surface SS2 may be inclined as a whole and have no vertical part.

The third position P3 may be closer to the display layer 200 than the fourth position P4. The third position P3 may be closer to the bending area BA than the fourth position P4. Accordingly, at least part of the second side surface SS2 may be a tapered surface of the second glass substrate 120. In an embodiment, the length of the second side surface SS2 in the length direction of the second glass substrate 120, for example, the y direction, may have a range of about 30 μm to about 500 μm. In an embodiment, the length of the second side surface SS2 in the length direction of the second glass substrate 120, for example, the y direction, may have a range of about 30 μm to about 350 μm.

The surface roughness of the second side surface SS2 may be less than the surface roughness of the third surface S3. In an embodiment, the surface roughness may be the center line average roughness (Ra). The second side surface SS2 is a surface formed by etching the glass substrate 100 and may be smoother than the third surface S3 and the fourth surface S4. In this case, the strength of the display panel 10 may be increased.

The thickness of the second glass substrate 120 may be about 0.2 mm. In an embodiment, the thickness of the second glass substrate 120 may be greater than about 0.2 mm. In an embodiment, the thickness of the second glass substrate 120 may be less than about 0.2 mm. The thickness of the second glass substrate 120 may be a distance between the third surface S3 and the fourth surface S4. The thickness 110t of the first glass substrate 110 and the thickness of the second glass substrate 120 may be the same.

The display layer 200 may be disposed on the first glass substrate 110 and the second glass substrate 120. The display layer 200 may include the first area AR1, the bending area BA, and the second area AR2. The first area AR1 may be disposed on the first glass substrate 110. The second area AR2 may be disposed on the second glass substrate 120. The bending area BA may overlap an area between the first glass substrate 110 and the second glass substrate 120. In other words, the bending area BA may not overlap the first glass substrate 110 and the second glass substrate 120. Accordingly, the display panel 10 may be easily bent in the bending area BA. Furthermore, as the first area AR1 is disposed on the first surface S1 of the first glass substrate 110 that is flat and the second area AR2 may be disposed on the second surface S2 of the second glass substrate 120 that is flat, flexion or surface waveform may be prevented or reduced from increasing in the display layer 200.

The display layer 200 may include the inorganic insulating layer IIL, a first gate wiring GWL1, a second gate wiring GWL2, a first organic material layer OL1, a connection wiring CWL, an upper wiring UWL, a second organic material layer OL2, a third organic material layer OL3, a fourth organic material layer OL4, a first pattern 216P, a second pattern 224P, and a third pattern 225P.

The inorganic insulating layer IIL may be disposed on the first glass substrate 110 and the second glass substrate 120. The inorganic insulating layer IIL may include the barrier layer 211, the buffer layer 212, the first gate insulating layer 213, the second gate insulating layer 214, and the interlayer insulating layer 215. In an embodiment, the inorganic insulating layer IIL may include (or define) an opening portion OP that overlaps the bending area BA. In other words, the inorganic insulating layer IIL may be disposed on the first glass substrate 110 and the second glass substrate 120, not on the bending area BA. Accordingly, the flexibility of the bending area BA may be increased.

The opening portion OP may include a first opening portion OP1 and a second opening portion OP2. The first opening portion OP1 may include an opening of the barrier layer 211 together with an opening of the buffer layer 212. The second opening portion OP2 may include an opening of the first gate insulating layer 213 together with an opening of the second gate insulating layer 214, and an opening of the interlayer insulating layer 215. The first opening portion OP1 and the second opening portion OP2 may overlap each other in the bending area BA, such as to be aligned with each other.

An opening may have a width in a direction along the organic protection layer OPL, such as in the y direction. In an embodiment, the width of the second opening portion OP2 may be greater than the width of the first opening portion OP1. In an embodiment, a minimum width of the second opening portion OP2 may be greater than a maximum width of the first opening portion OP1. The width of the first opening portion OP1 may be the shortest distance between sidewalls of the barrier layer 211 which face each other at the first opening portion OP1. The width of the second opening portion OP2 may be the shortest distance between sidewalls of the first gate insulating layer 213 which face each other at the second opening portion OP2. Accordingly, the opening portion OP may have a step, and at least part of an upper surface of the buffer layer 212 may be exposed to outside the first gate insulating layer 213, the second gate insulating layer 214 and the interlayer insulating layer 215, by the second opening portion OP2.

The first gate wiring GWL1 may be disposed in the first area AR1. The first gate wiring GWL1 may be disposed on the first glass substrate 110. In an embodiment, the first gate wiring GWL1 may be disposed between the second gate insulating layer 214 and the interlayer insulating layer 215. The first gate wiring GWL1 may include a conductive material including Mo, Al, Cu, Ti, and the like, and may be provided as a single layer or a multilayer including the above materials. In this case, the first gate wiring GWL1 and the gate electrode GE may be formed in the same process and may include the same material. In an embodiment, the first gate wiring GWL1 may be disposed between the first gate insulating layer 213 and the second gate insulating layer 214. The first gate wiring GWL1 may include Al, Pt, Pd, Ag, Mg, Au, Ni, Nd, Ir, Cr, Ca, Mo, Ti, W, and/or Cu, and may be a single layer or a multilayer of the above-described materials. In this case, the first gate wiring GWL1 and the upper electrode CE2 of the storage capacitor Cst may be formed in the same process and may include the same material. As being formed in a same process and/or as including a same material, elements may be in a same layer as each other as respective portions of a same material layer, may be on a same layer by forming an interface with a same underlying or overlying layer, etc., without being limited thereto.

The second gate wiring GWL2 may be disposed in the second area AR2. The second gate wiring GWL2 may be disposed on the second glass substrate 120. In an embodiment, the second gate wiring GWL2 may be disposed between the second gate insulating layer 214 and the interlayer insulating layer 215. The second gate wiring GWL2 may include a conductive material including Mo, Al, Cu, Ti, and the like, and may be provided as a single layer or a multilayer including the above materials. In this case, the second gate wiring GWL2 and the gate electrode GE may be formed in the same process and may include the same material. In an embodiment, the second gate wiring GWL2 may be disposed between the first gate insulating layer 213 and the second gate insulating layer 214. The second gate wiring GWL2 may include Al, Pt, Pd, Ag, Mg, Au, Ni, Nd, Ir, Cr, Ca, Mo, Ti, W, and/or Cu, and may be a single layer or a multilayer of the above-described materials. In this case, the second gate wiring GWL2 and the upper electrode CE2 of the storage capacitor Cst may be formed in the same process and may include the same material.

The first organic material layer OL1 may be disposed in the bending area BA. The first organic material layer OL1 may extend from the bending area BA to the first area AR1, and cover an end portion of the inorganic insulating layer IIL that defines the opening portion OP in the first area AR1. The first organic material layer OL1 may extend from the bending area BA to the second area AR2, and may cover an end portion of the inorganic insulating layer IIL that defines the opening portion OP in the second area AR2. The first organic material layer OL1 may include an organic material. The first organic material layer OL1 may include an organic insulating material such as general purpose polymers such as PMMA or PS, polymer derivatives having a phenolic group, acrylic polymer, imide-based polymer, arylether-based polymer, amide-based polymer, fluorine-based polymer, p-xylene-based polymer, vinyl alcohol-based polymer, and blends thereof.

The first organic material layer OL1 may reduce a height difference due to layers defining the opening portion OP relative to a reference surface (e.g., at the organic protection layer OPL, for example) or absorb stress acting on the connection wiring CWL. Accordingly, damage to the connection wiring CWL may be prevented or reduced.

The connection wiring CWL may be disposed on the first organic material layer OL1. The connection wiring CWL may overlap the bending area BA. The connection wiring CWL may extend from the second area AR2 to the first area AR1. The connection wiring CWL may be connected to the first gate wiring GWL1 in the first area AR1. In an embodiment, the connection wiring CWL may be connected to the first gate wiring GWL1 through a first contact hole provided in the interlayer insulating layer 215 in the first area AR1. The connection wiring CWL may be connected to the second gate wiring GWL2 in the second area AR2. In an embodiment, the connection wiring CWL may be connected to the second gate wiring GWL2 through a second contact hole provided in the interlayer insulating layer 215 in the second area AR2. The connection wiring CWL may transmit a signal or a power voltage received from a pad disposed in the second area AR2 to the first area AR1.

The connection wiring CWL may include a conductive material including Mo, Al, Cu, Ti, or the like, and may be provided as a single layer or a multilayer including the above materials. In an embodiment, the connection wiring CWL may have a multilayer structure of Ti/Al/Ti.

The upper wiring UWL may be disposed in the first area AR1. The upper wiring UWL may be disposed on the interlayer insulating layer 215. The upper wiring UWL may be connected to the first gate wiring GWL1. In an embodiment, the upper wiring UWL may be connected to the first gate wiring GWL1 through a third contact hole provided in the interlayer insulating layer 215. The upper wiring UWL may include a conductive material including Mo, Al, Cu, Ti, or the like, and may be provided as a single layer or a multilayer including the above materials. In an embodiment, the upper wiring UWL may have a multilayer structure of Ti/Al/Ti. In an embodiment, the connection wiring CWL, the upper wiring UWL, source electrode, and drain electrode may be formed in the same process and may include the same material.

The second organic material layer OL2 may be disposed on the connection wiring CWL. The second organic material layer OL2 may cover the connection wiring CWL. The second organic material layer OL2 may include an organic material. The second organic material layer OL2 may include an organic insulating material such as general purpose polymers such as PMMA or PS, polymer derivatives having a phenolic group, acrylic polymer, imide-based polymer, arylether-based polymer, amide-based polymer, fluorine-based polymer, p-xylene-based polymer, vinyl alcohol-based polymer, and blends thereof. In an embodiment, the second organic material layer OL2 may be formed in the same process as the organic insulating layer 216 of FIG. 5A and may be formed in the same process and may include the same material.

The connection wiring CWL may be disposed between the first organic material layer OL1 and the second organic material layer OL2. When the display panel 10 is bent in the bending area BA, a stress neutral plane may be present in the display panel 10. When the connection wiring CWL is not disposed between the first organic material layer OL1 and the second organic material layer OL2, excessive stress may be applied to the connection wiring CWL. This is because the location of the connection wiring CWL does not correspond to the stress neutral plane. However, as the connection wiring CWL is disposed between the first organic material layer OL1 and the second organic material layer OL2, the location of the stress neutral plane may be adjusted. Accordingly, the stress applied to the connection wiring CWL may be reduced.

In an embodiment, the second organic material layer OL2 may have a step in the first area AR1. The step of the second organic material layer OL2 may be formed by using a half tone mask.

The third organic material layer OL3 may be disposed on the second organic material layer OL2. The third organic material layer OL3 may include an organic insulating material. In an embodiment, when the pixel defining layer 224 includes an organic insulating material, the third organic material layer OL3 and the pixel defining layer 224 may be formed in the same process and may include the same material.

The fourth organic material layer OL4 may be formed on the third organic material layer OL3. The fourth organic material layer OL4 may include an organic material. In an embodiment, when the spacer 225 includes an organic material, the fourth organic material layer OL4 and the spacer 225 may be formed in the same process and may include the same material.

The first pattern 216P may be disposed in the first area AR1. The first pattern 216P may cover an edge of the upper wiring UWL. In an embodiment, the first pattern 216P and the second organic material layer OL2 may be separated from each other. In an embodiment, the first pattern 216P may include an organic material. The first pattern 216P may include an organic insulating material such as general purpose polymers such as PMMA or PS, polymer derivatives having a phenolic group, acrylic polymer, imide-based polymer, arylether-based polymer, amide-based polymer, fluorine-based polymer, p-xylene-based polymer, vinyl alcohol-based polymer, and blends thereof. In an embodiment, the first pattern 216P may be formed in the same process as the organic insulating layer 216 of FIG. 5A and may include the same material.

The second pattern 224P may be disposed on the first pattern 216P. The second pattern 224P may include an organic insulating material. The second pattern 224P may be separated from the third organic material layer OL3. In an embodiment, when the pixel defining layer 224 includes an organic insulating material, the second pattern 224P and the pixel defining layer 224 may be formed in the same process and may include the same material.

The third pattern 225P may be disposed on the second pattern 224P. The third pattern 225P may be separated from the fourth organic material layer OL4. The third pattern 225P may include an organic material. In an embodiment, when the spacer 225 includes an organic material, the third pattern 225P and the spacer 225 may be formed in the same process and may include the same material.

The touch sensor layer 400 may be disposed on the display layer 200. The touch sensor layer 400 may include the first touch insulating layer 410, the second touch insulating layer 430, a touch wiring 460, and the third touch insulating layer 450. The first touch insulating layer 410 and the second touch insulating layer 430 may be disposed on the first pattern 216P, the second pattern 224P, and the third pattern 225P. The first touch insulating layer 410 and the second touch insulating layer 430 may cover the first pattern 216P, the second pattern 224P, and the third pattern 225P.

In an embodiment, the touch wiring 460 may be disposed on the second touch insulating layer 430. The touch wiring 460 may be connected to the upper wiring UWL through touch contact holes provided in the first touch insulating layer 410 and the second touch insulating layer 430 in the first area AR1. Accordingly, the touch wiring 460 may be electrically connected to the connection wiring CWL. The touch wiring 460 may be connected to the touch electrode. The touch wiring 460 may include Mo, Al, Cu, Ti, and the like, and may be provided as a single layer or a multilayer including the above materials. In an embodiment, the touch wiring 460 may have a multilayer structure of Ti/Al/Ti.

The third touch insulating layer 450 may be disposed on the touch wiring 460 and the second touch insulating layer 430. The third touch insulating layer 450 may extend to the third organic material layer OL3.

The organic protection layer OPL may be disposed in the bending area BA. The organic protection layer OPL may extend between the first glass substrate 110 and the display layer 200. The organic protection layer OPL may extend between the second glass substrate 120 and the display layer 200. The organic protection layer OPL may be exposed to outside the glass substrate 100 between the first glass substrate 110 and the second glass substrate 120 and corresponding to the bending area BA. The organic protection layer OPL may include an organic material. The organic protection layer OPL may have high acid resistance. Accordingly, when the glass substrate 100 is etched, the organic protection layer OPL may prevent or reduce the display layer 200 from being damaged. Furthermore, the organic protection layer OPL may prevent or reduce the infiltration of etching materials into the display layer 200.

Figure 5C:
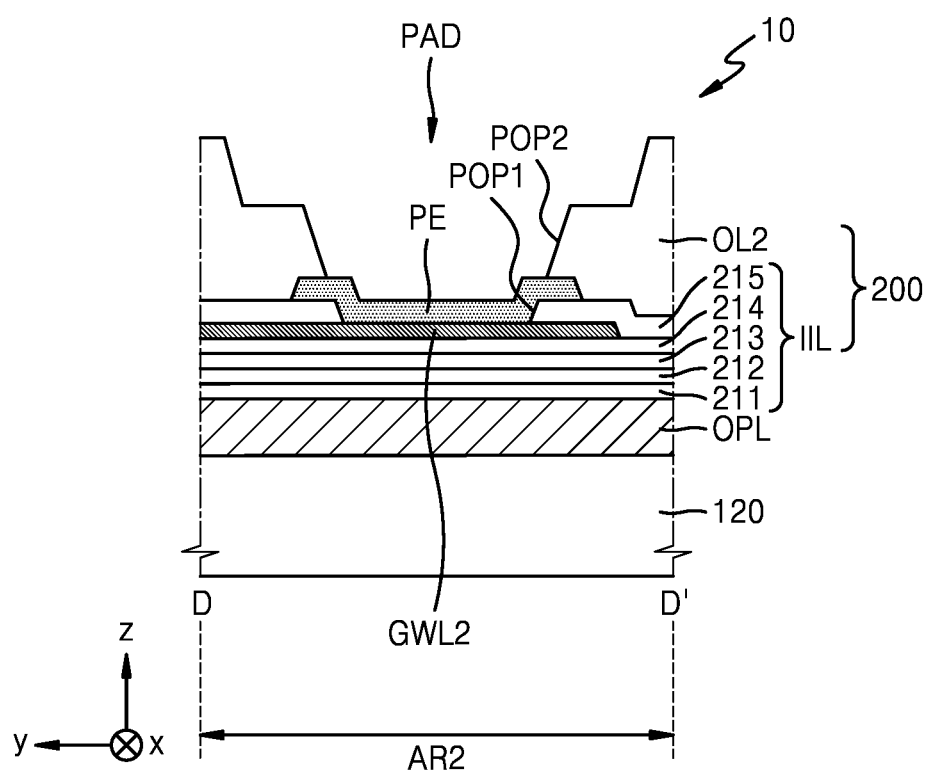
FIG. 5C is a schematic cross-sectional view taken along line D-D' of FIG. 3, showing a display panel according to an embodiment.

FIG. 5C is a schematic cross-sectional view taken along line D-D' of FIG. 3, showing the display panel 10 according to an embodiment. Throughout FIGS. 5A to 5C, like reference numerals denote like elements, and thus, redundant descriptions thereof are omitted.

Referring to FIG. 5C, the display panel 10 may include the second glass substrate 120, the organic protection layer OPL, and the display layer 200.

The organic protection layer OPL may be disposed on the second glass substrate 120. The display layer 200 may be disposed on the organic protection layer OPL. The display layer 200 may include the inorganic insulating layer IIL, the second gate wiring GWL2, a pad electrode PE, and the second organic material layer OL2.

The pad electrode PE may constitute the pad PAD. The pad electrode PE may be disposed on the inorganic insulating layer IIL. The second gate wiring GWL2 may be connected to the pad electrode PE. In an embodiment, the pad electrode PE and the second gate wiring GWL2 may be connected to each other through a first pad opening portion POP1 of the interlayer insulating layer 215 in the second area AR2.

The second organic material layer OL2 may be disposed on the pad electrode PE and the inorganic insulating layer IIL. The second organic material layer OL2 may include a second pad opening portion POP2. The second pad opening portion POP2 may overlap the pad electrode PE and may expose the pad electrode PE to outside the second organic material layer OL2. The second organic material layer OL2 may have a step defined by sidewalls at the second pad opening POP2. In an embodiment, among thickness portions of the second organic material layer OL2, the height of a first thickness portion of the second organic material layer OL2 which is adjacent (or closest) to the pad electrode PE may be less than the height of a second thickness portion of the second organic material layer OL2 which is further from the pad electrode PE than the first thickness portion. Accordingly, the pad electrode PE may be electrically connected to the display driving unit 30 through an anisotropic conductive film.

Figure 6:
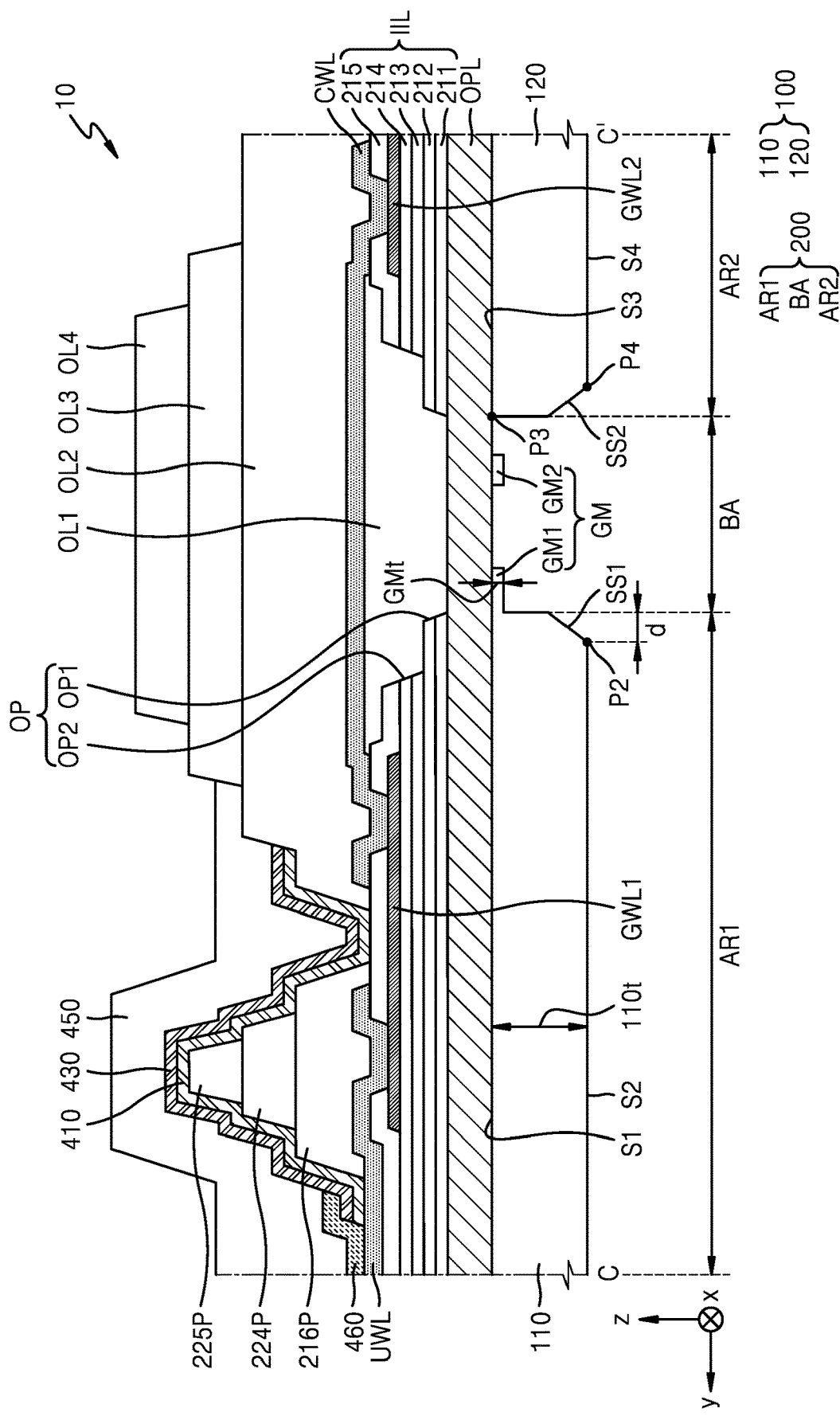
FIG. 6 is a schematic cross-sectional view taken along line C-C' of FIG. 3, showing a display panel according to an embodiment.

FIG. 6 is a schematic cross-sectional view taken along line C-C' of FIG. 3, showing the display panel 10 according to an embodiment. In FIG. 6 and FIG. 5B, like reference numerals denote like elements, and thus, redundant descriptions thereof are omitted.

Referring to FIG. 6, the display panel 10 may include the glass substrate 100, the display layer 200, the touch sensor layer 400, the organic protection layer OPL, and a glass member GM. The glass substrate 100 may include the first glass substrate 110 and the second glass substrate 120. The display panel 10 of FIG. 6 characteristically further include the glass member GM, compared with the display panel 10 of FIG. 5B.

The glass member GM may be disposed in the bending area BA. The glass member GM may include the same material as the glass substrate 100. The glass member GM may be glass that remains in the bending area BA after the glass substrate 100 is etched. In an embodiment, the glass member GM may be a remaining member. The glass member GM may have an irregular shape. In an embodiment, a thickness GMt of the glass member GM may be less than the thickness 110t of the first glass substrate 110. In an embodiment, for example, the thickness GMt of the glass member GM may be about 30 μm or less.

The glass member GM may include at least one of a first glass member GM1 and a second glass member GM2. In an embodiment, the first glass member GM1 may be integrally formed with the first glass substrate 110 or the second glass substrate 120. The second glass member GM2 may be spaced apart from each of the first glass substrate 110 and the second glass substrate 120. That is, the glass substrate 100 may be considered as having disconnected portions at the bending area BA.

Figure 7:
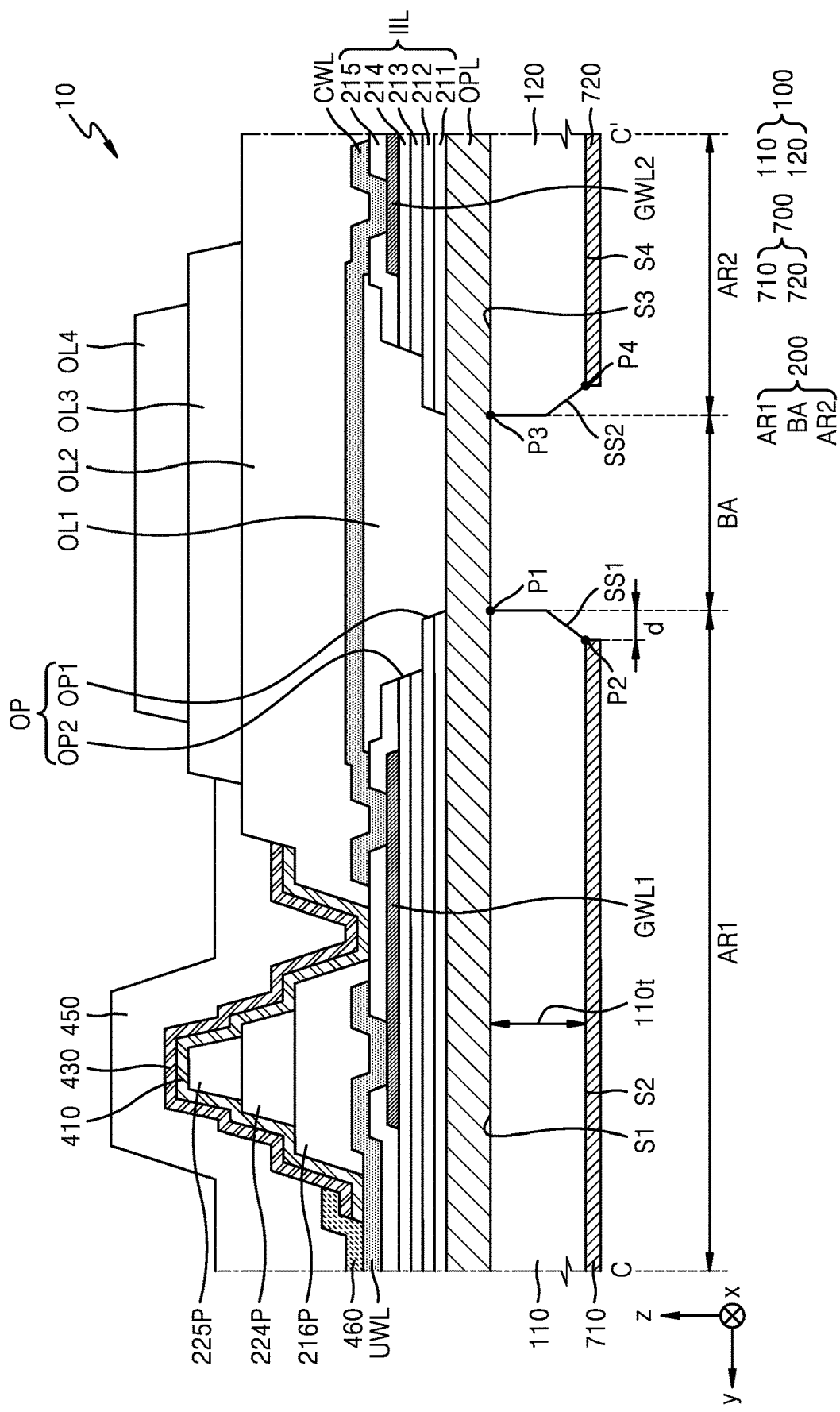
FIG. 7 is a schematic cross-sectional view taken along line C-C' of FIG. 3, showing a display panel according to an embodiment.

FIG. 7 is a schematic cross-sectional view taken along line C-C' of FIG. 3, showing the display panel 10 according to an embodiment. In FIG. 7 and FIG. 5B, like reference numerals denote like elements, and thus, redundant descriptions thereof are omitted.

Referring to FIG. 7, the display panel 10 may include the glass substrate 100, the display layer 200, the touch sensor layer 400, the organic protection layer OPL, and an adhesive member 700. The glass substrate 100 may include the first glass substrate 110 and the second glass substrate 120. The display panel 10 of FIG. 7 characteristically further includes the adhesive member 700, compared with the display panel 10 of FIG. 5B.

The adhesive member 700 may be disposed below the glass substrate 100, such as to face the organic protection layer OPL with the glass substrate 100 therebetween. In an embodiment, the adhesive member 700 may include a first adhesive member 710 and a second adhesive member 720. The first adhesive member 710 may be disposed below the first glass substrate 110. The first adhesive member 710 may be disposed on the second surface S2. Although FIG. 7 illustrates that the first adhesive member 710 is entirely disposed on the second surface S2, in an embodiment, the first adhesive member 710 may be at least partially disposed on the second surface S2. The first adhesive member 710 may not be disposed on the first side surface SS1. The second adhesive member 720 may be disposed below the second glass substrate 120. The second adhesive member 720 may be disposed on the fourth surface S4. Although FIG. 7 illustrates that the second adhesive member 720 is entirely disposed on the fourth surface S4, in an embodiment, the second adhesive member 720 may be at least partially disposed on the fourth surface S4. The second adhesive member 720 may not be disposed on the second side surface SS2. In embodiments, any one of the first adhesive member 710 and the second adhesive member 720 may be omitted. The adhesive member 700 may include an adhesive material.

When the glass substrate 100 is etched, a protection film PF as a temporary protection film may be removably attached to a lower surface of the first glass substrate 110 and a lower surface of the second glass substrate 120. The protection film PF may be removably attached to the glass substrate 100 via the adhesive layer. After the etching process, the protection film PF and the adhesive layer may be removed, and the adhesive member 700, as part of the adhesive layer, may remain below the first glass substrate 110 and/or the second glass substrate 120.

Figure 8:
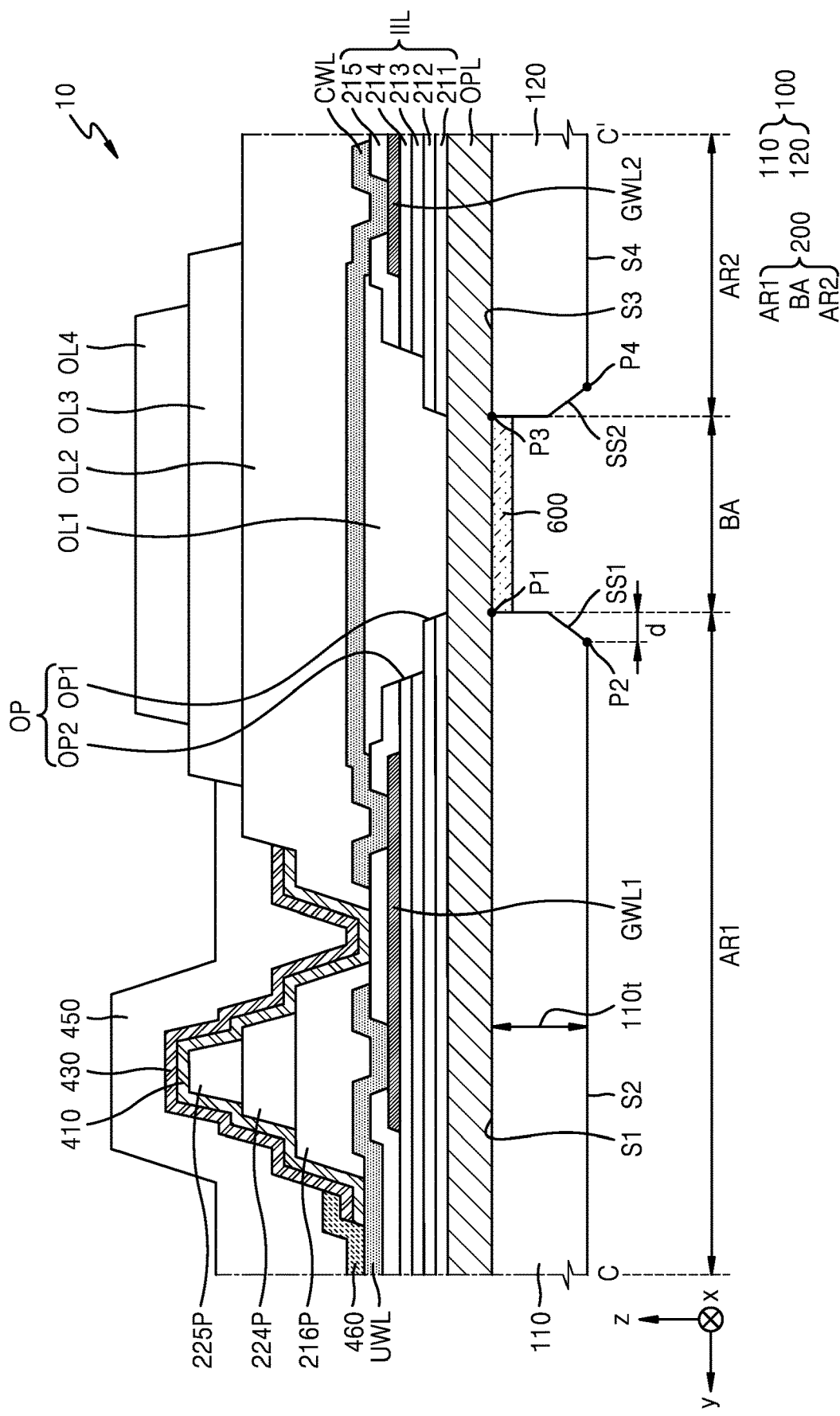
FIG. 8 is a schematic cross-sectional view taken along line C-C' of FIG. 3, showing a display panel according to an embodiment.

FIG. 8 is a schematic cross-sectional view taken along line C-C' of FIG. 3, showing the display panel 10 according to an embodiment. In FIG. 8 and FIG. 5B, like reference numerals denote like elements, and thus, redundant descriptions thereof are omitted.

Referring to FIG. 8, the display panel 10 may include the glass substrate 100, the display layer 200, the touch sensor layer 400, the organic protection layer OPL, and a filling layer 600. The glass substrate 100 may include the first glass substrate 110 and the second glass substrate 120. The display panel 10 of FIG. 8 characteristically further includes the filling layer 600, compared with the display panel 10 of FIG. 5B.

The filling layer 600 may be disposed between the first glass substrate 110 and the second glass substrate 120. The filling layer 600 may overlap the bending area BA. In an embodiment, the filling layer 600 may include an organic material. The filling layer 600 may include resin. The filling layer 600 may prevent or reduce damage or scratches to the display layer 200 and/or the organic protection layer OPL.

Figure 9A:
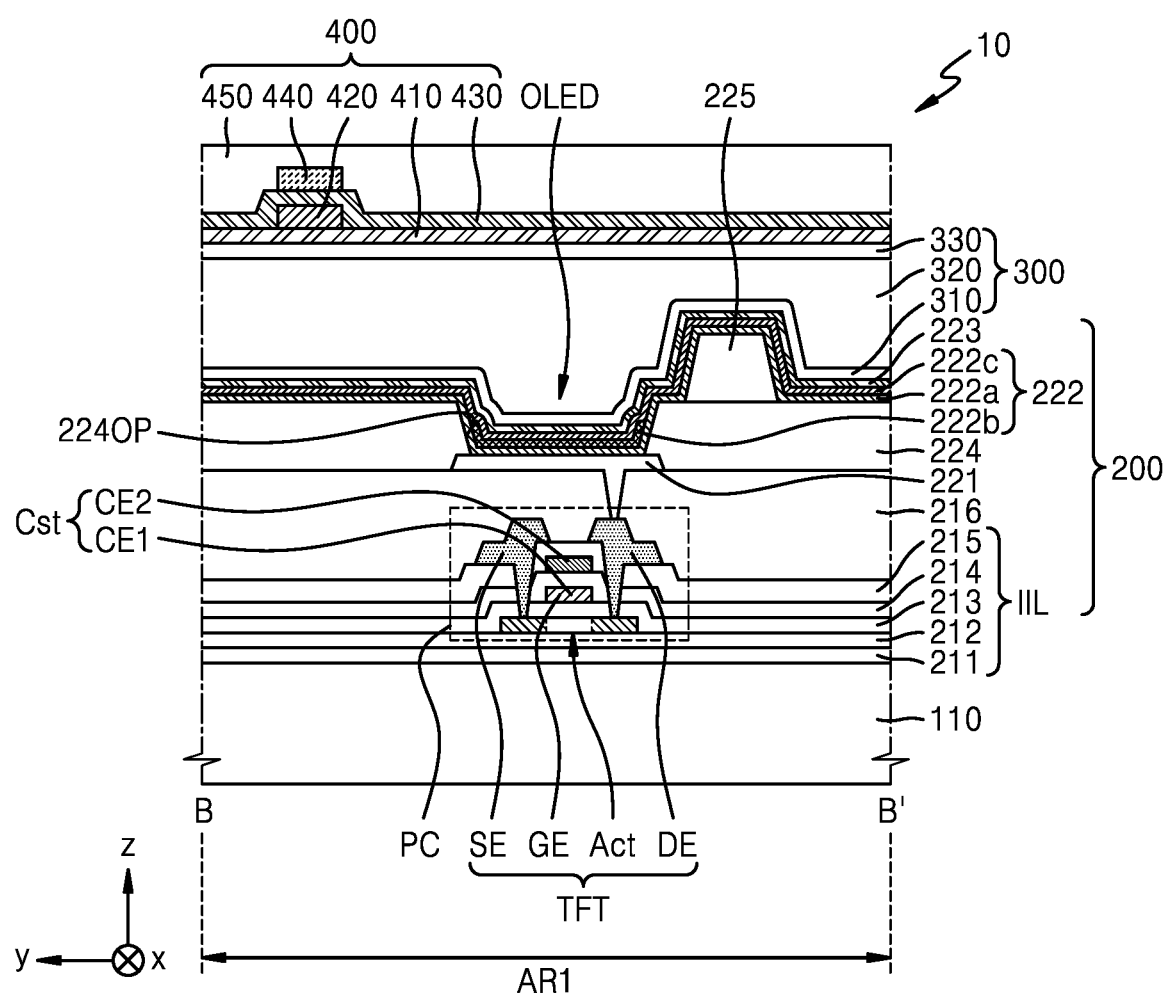
FIG. 9A is a schematic cross-sectional view taken along line B-B' of FIG. 3, showing a display panel according to an embodiment.

FIG. 9A is a schematic cross-sectional view taken along line B-B' of FIG. 3, showing the display panel 10 according to an embodiment. In FIG. 9A and FIG. 5A, like reference numerals denote like elements, and thus, redundant descriptions thereof are omitted.

Referring to FIG. 9A, the display panel 10 may include the first glass substrate 110, the display layer 200, the encapsulation layer 300, and the touch sensor layer 400. The display panel 10 of FIG. 9A characteristically omits the organic protection layer OPL when compared with the display panel 10 of FIG. 5A. Accordingly, the display layer 200 may be disposed on the first glass substrate 110.

Figure 9B:
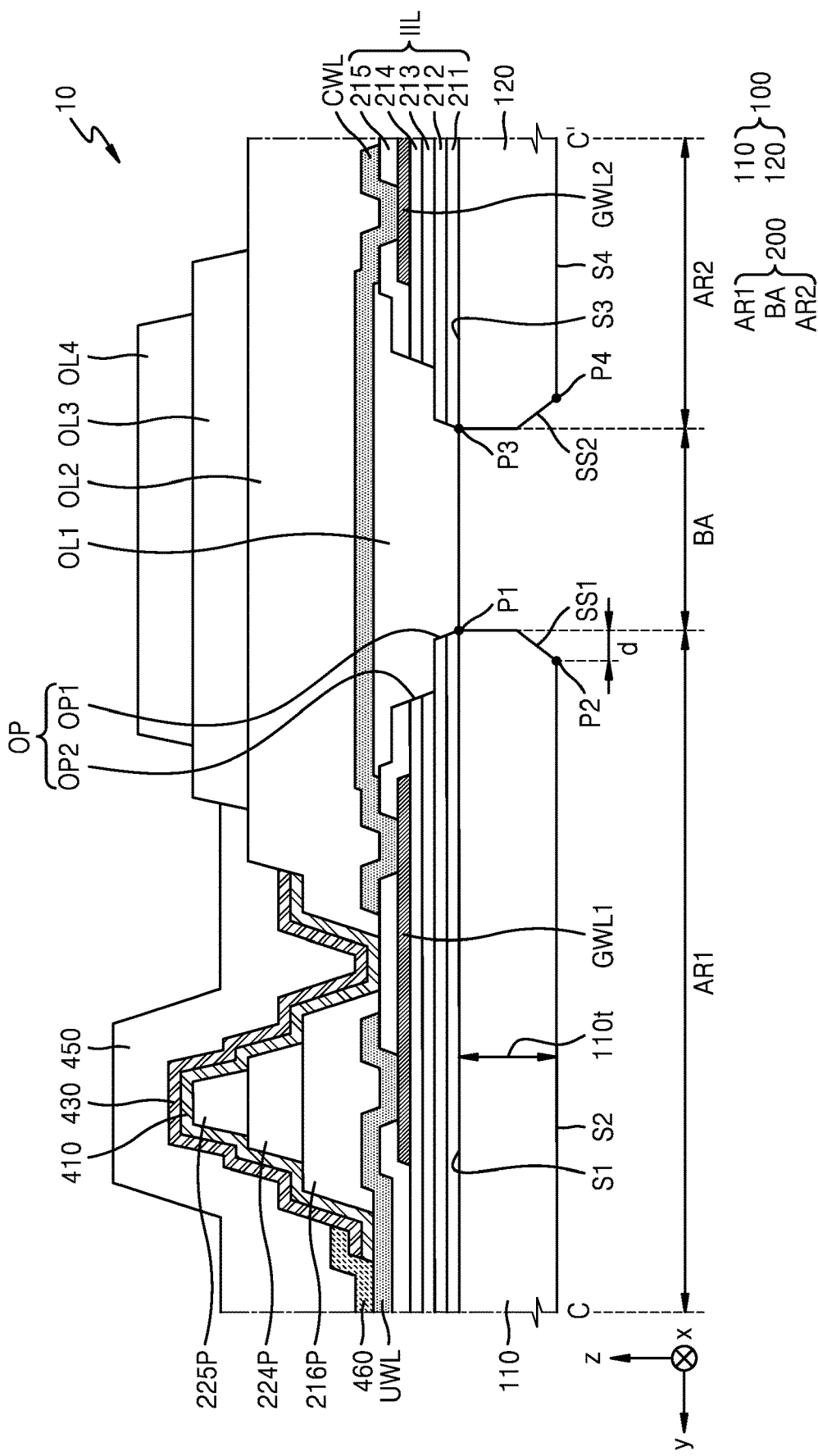
FIG. 9B is a schematic cross-sectional view taken along line C-C' of FIG. 3, showing a display panel according to an embodiment.

FIG. 9B is a schematic cross-sectional view taken along line C-C' of FIG. 3, showing the display panel 10 according to an embodiment. In FIG. 9B and FIG. 5B, like reference numerals denote like elements, and thus, redundant descriptions thereof are omitted.

Referring to FIG. 9B, the display panel 10 may include the glass substrate 100, the display layer 200, and the touch sensor layer 400. The glass substrate 100 may include the first glass substrate 110 and the second glass substrate 120. The display panel 10 of FIG. 9B characteristically omits the organic protection layer OPL when compared with the display panel 10 of FIG. 5B. Accordingly, the first organic material layer OL1 may be exposed to outside the glass substrate 100, at a gap between the first glass substrate 110 and the second glass substrate 120. The first organic material layer OL1 may include an organic material. The first organic material layer OL1, which may have high acid resistance, may prevent or reduce damage to the constituent elements of the display layer 200 due to an etching material when the glass substrate 100 is etched. Furthermore, the first organic material layer OL1 may prevent or reduce the etching material from infiltrating into the first area AR1 and/or the second area AR2.

Figure 9C:
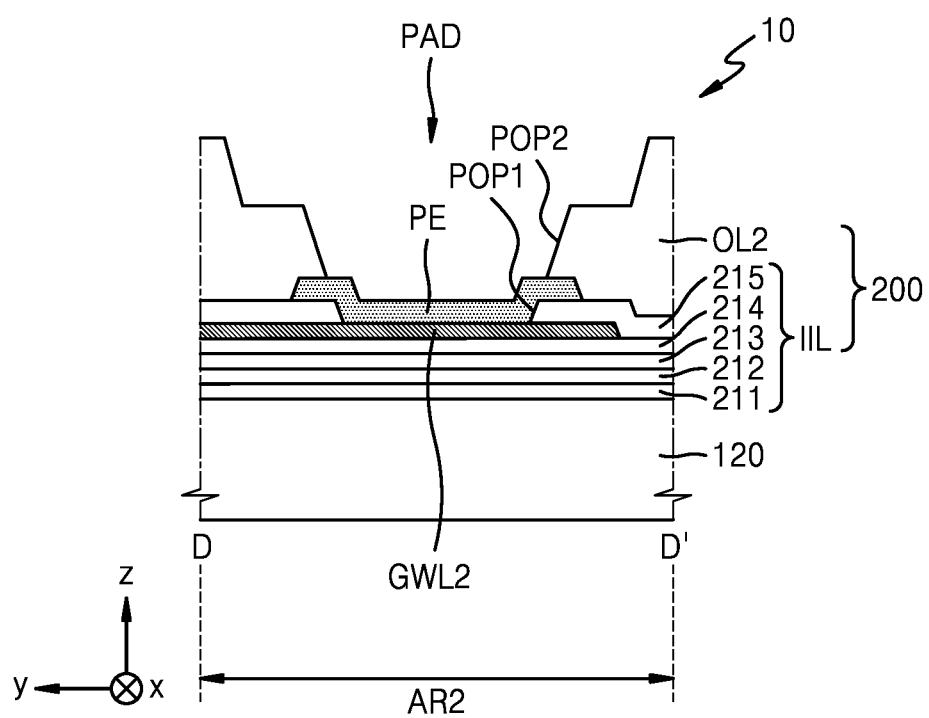
FIG. 9C is a schematic cross-sectional view taken along line D-D' of FIG. 3, showing a display panel according to an embodiment.

FIG. 9C is a schematic cross-sectional view taken along line C-C' of FIG. 3, showing the display panel 10 according to an embodiment. In FIG. 9C and FIG. 5B, like reference numerals denote like elements, and thus, redundant descriptions thereof are omitted.

Referring to FIG. 9C, the display panel 10 may include the second glass substrate 120 and the display layer 200. The display panel 10 of FIG. 9C characteristically omits the organic protection layer OPL when compared with the display panel 10 of FIG. 5C. Accordingly, the display layer 200 may be disposed on the second glass substrate 120.

Figure 10:
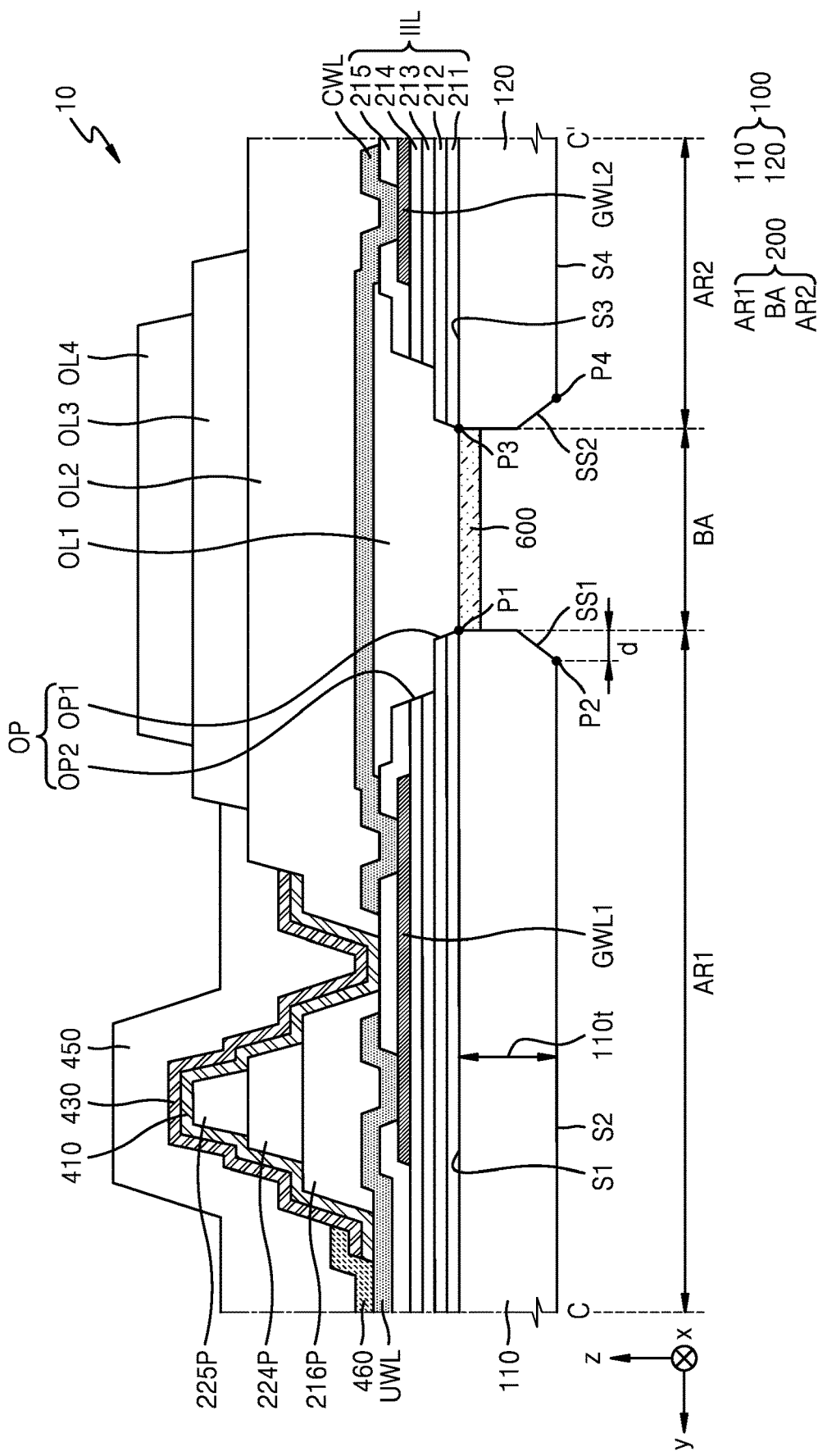
FIG. 10 is a schematic cross-sectional view taken along line C-C' of FIG. 3, showing a display panel according to an embodiment.

FIG. 10 is a schematic cross-sectional view taken along line C-C' of FIG. 3, showing the display panel 10 according to an embodiment. In FIG. 10 and FIG. 9B, like reference numerals denote like elements, and thus, redundant descriptions thereof are omitted.

Referring to FIG. 10, the display panel 10 may include the glass substrate 100, the display layer 200, the touch sensor layer 400, and the filling layer 600. The glass substrate 100 may include the first glass substrate 110 and the second glass substrate 120. The display panel 10 of FIG. 10 characteristically further includes the filling layer 600 when compared with the display panel 10 of FIG. 9B.

The filling layer 600 may be disposed between the first glass substrate 110 and the second glass substrate 120. The filling layer 600 may overlap the bending area BA. In an embodiment, the filling layer 600 may include an organic material. The filling layer 600 may include resin. The filling layer 600 may prevent or reduce damage or scratches to the display layer 200.

Figure 11:
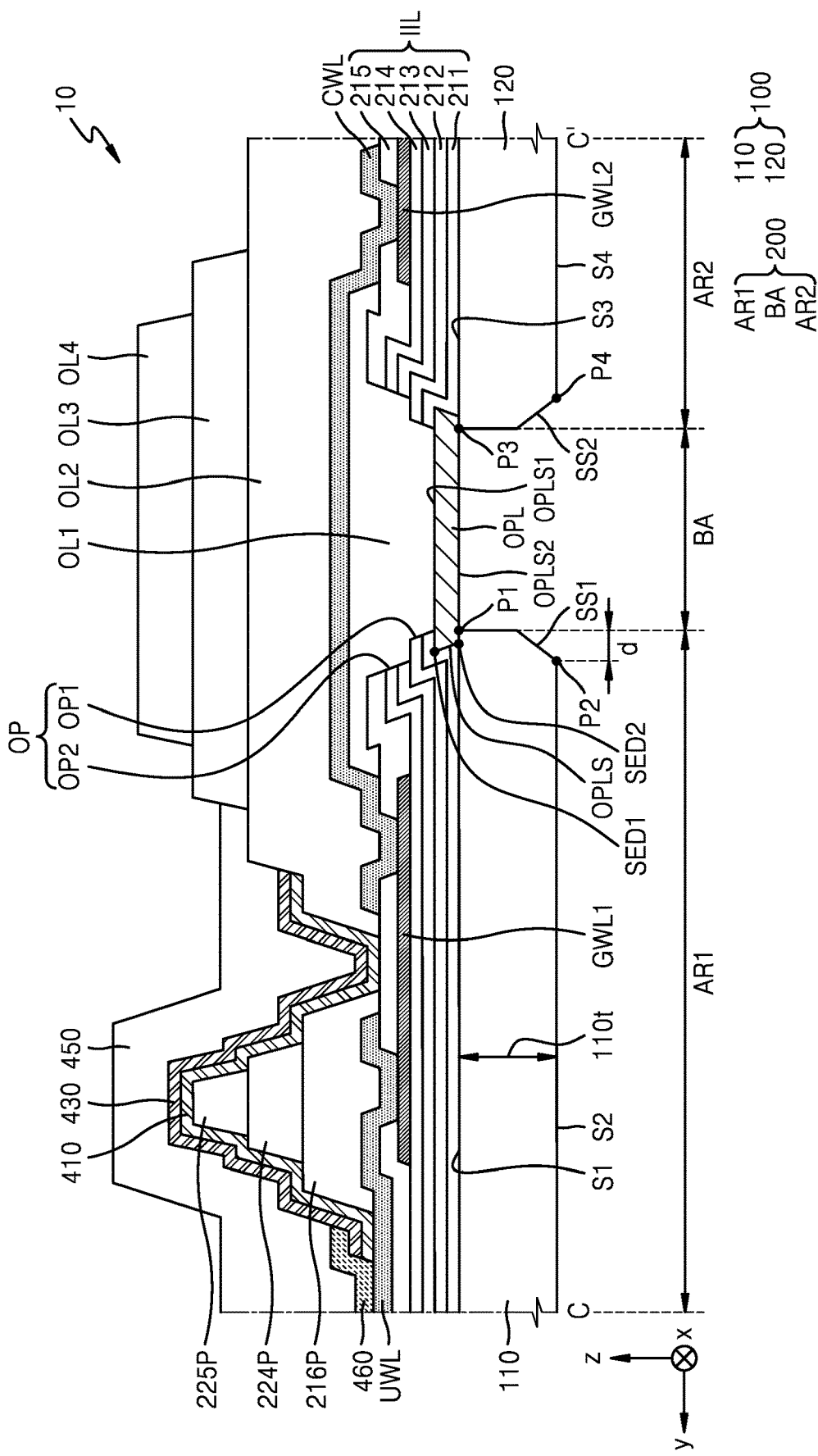
FIG. 11 is a schematic cross-sectional view taken along line C-C' of FIG. 3, showing a display panel according to an embodiment.

FIG. 11 is a schematic cross-sectional view taken along line C-C' of FIG. 3, showing the display panel 10 according to an embodiment. In FIG. 11 and FIG. 5B, like reference numerals denote like elements, and thus, redundant descriptions thereof are omitted.

Referring to FIG. 11, the display panel 10 may include the glass substrate 100, the display layer 200, the touch sensor layer 400, and the organic protection layer OPL. The glass substrate 100 may include the first glass substrate 110 and the second glass substrate 120. The display panel 10 of FIG. 11, compared with the display panel 10 of FIG. 5B, is characteristic in that the organic protection layer OPL is disposed only in the bending area BA and in a region adjacent to the bending area BA, as a protection layer pattern. The protection layer pattern extends in a direction away from the glass substrate 100. That is, the glass substrate 100 is exposed to outside the organic protection layer OPL at the first area AR1 and at the second area AR2.

The organic protection layer OPL may be disposed in the bending area BA. The organic protection layer OPL may extend to the first glass substrate 110. The organic protection layer OPL may include a first protection layer surface OPLS1, a second protection layer surface OPLS2, and a protection layer side surface OPLS. The first protection layer surface OPLS1 may be a surface facing the display layer 200. The first protection layer surface OPLS1 may have a first edge SED1. The second protection layer surface OPLS2 may be a surface opposite to the first protection layer surface OPLS1. Part of the second protection layer surface OPLS2 may be exposed between the first glass substrate 110 and the second glass substrate 120. The second protection layer surface OPLS2 may have a second edge SED2. The protection layer side surface OPLS may be a surface connecting the first protection layer surface OPLS1 and the second protection layer surface OPLS2. The protection layer side surface OPLS may meet the first protection layer surface OPLS1 at the first edge SED1. The protection layer side surface OPLS may meet the second protection layer surface OPLS2 at the second edge SED2. The protection layer side surface OPLS may be inclined. In other words, the protection layer side surface OPLS may be a tapered surface. The first edge SED1 may be located further from the bending area BA than the second edge SED2.

The display layer 200 may include the inorganic insulating layer IIL, the first gate wiring GWL1, the second gate wiring GWL2, the first organic material layer OL1, the connection wiring CWL, the upper wiring UWL, the second organic material layer OL2, the third organic material layer OL3, the fourth organic material layer OL4, the first pattern 216P, the second pattern 224P, and the third pattern 225P. The inorganic insulating layer IIL may cover the protection layer side surface OPLS.

The organic protection layer OPL may be exposed at the gap between the first glass substrate 110 and the second glass substrate 120. The organic protection layer OPL may include an organic material. The organic protection layer OPL may have high acid resistance. Accordingly, the organic protection layer OPL may prevent or reduce damage to the display layer 200 when the glass substrate 100 is etched. Furthermore, the organic protection layer OPL may prevent or reduce infiltration of an etching material into the display layer 200.

Figure 12:
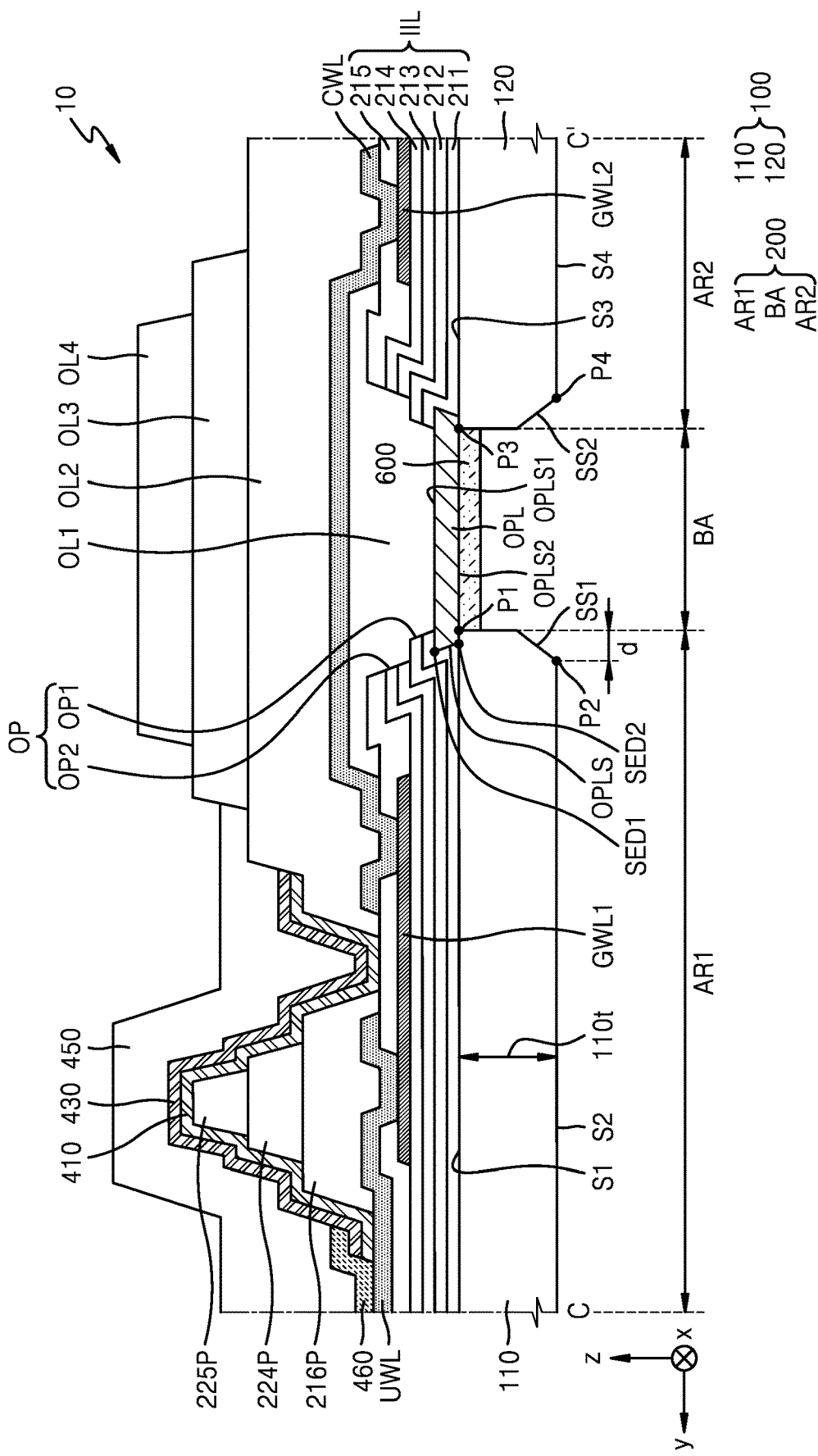
FIG. 12 is a schematic cross-sectional view taken along line C-C' of FIG. 3, showing a display panel according to an embodiment.

FIG. 12 is a schematic cross-sectional view taken along line C-C' of FIG. 3, showing the display panel 10 according to an embodiment. In FIG. 12 and FIG. 11, like reference numerals denote like elements, and thus, redundant descriptions thereof are omitted.

Referring to FIG. 12, the display panel 10 may include the glass substrate 100, the display layer 200, the touch sensor layer 400, the organic protection layer OPL, and the filling layer 600. The glass substrate 100 may include the first glass substrate 110 and the second glass substrate 120. The display panel 10 of FIG. 12 characteristically further includes the filling layer 600, when compared with the display panel 10 of FIG. 11.

The filling layer 600 may be disposed between the first glass substrate 110 and the second glass substrate 120. The filling layer 600 may overlap the bending area BA. In an embodiment, the filling layer 600 may include an organic material. The filling layer 600 may include resin. The filling layer 600 may prevent or reduce damage or scratches to the display layer 200 and/or the organic protection layer OPL as a protection layer pattern. The protection layer pattern extends in a direction away from the display layer 200.

FIGS. 13A to 13F are schematic cross-sectional views of a method of manufacturing (or providing) a display device 1 according to an embodiment.

Figure 13A:
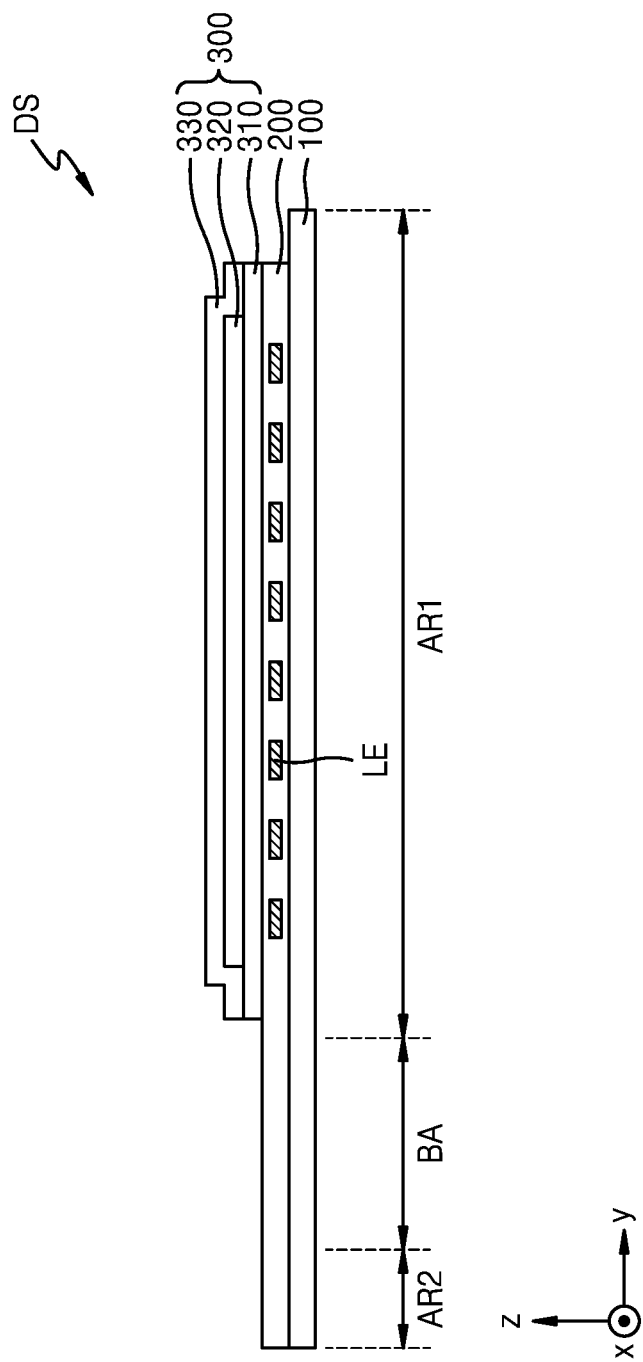
FIGS. 13A to 13F are schematic cross-sectional views showing a method of manufacturing the display device according to an embodiment.

Referring to FIG. 13A, a display substrate DS may be prepared. The display substrate DS may include the glass substrate 100, the display layer 200, and the encapsulation layer 300. The display layer 200 may be disposed on the glass substrate 100. The display layer 200 may include the first area AR1, the bending area BA, and the second area AR2. The light-emitting device LE may be disposed in the first area AR1. The bending area BA may extend from the first area AR1. The second area AR2 may extend from the bending area BA. The encapsulation layer 300 may be disposed on the display layer 200. The encapsulation layer 300 may cover the light-emitting device LE. In an embodiment, the encapsulation layer 300 may be disposed in the first area AR1. The encapsulation layer 300 may not be disposed in the bending area BA. The encapsulation layer 300 may include at least one inorganic encapsulation layer and at least one organic encapsulation layer that are alternately stacked. In an embodiment, the encapsulation layer 300 may include the first inorganic encapsulation layer 310, the organic encapsulation layer 320, and the second inorganic encapsulation layer 330.

Referring to FIGS. 13B to 13E, the bending area BA of the display layer 200 may be exposed by etching the glass substrate 100.

Figure 13B:
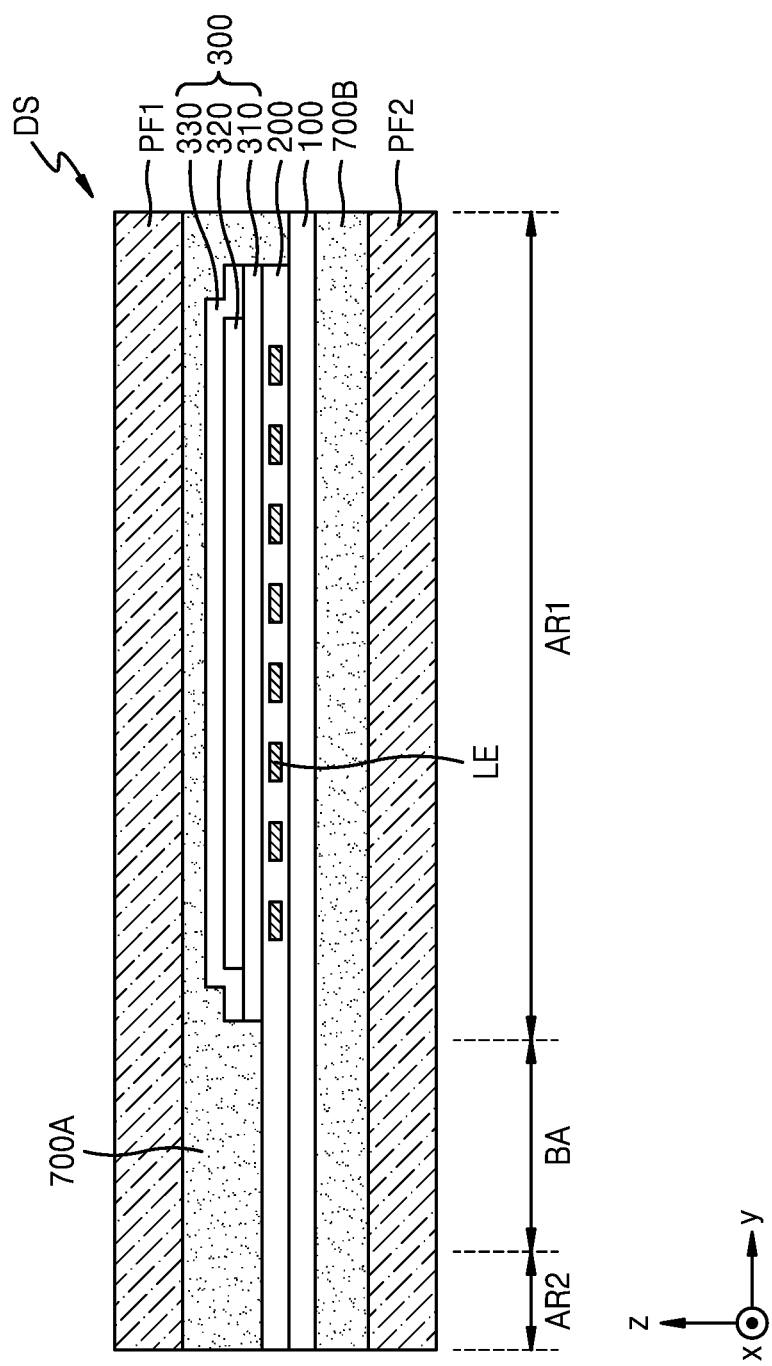

Referring to FIG. 13B, a first adhesive layer 700A and a first protection film PF1 may be disposed on the encapsulation layer 300. The first adhesive layer 700A may be disposed between the encapsulation layer 300 and the first protection film PF1. The first adhesive layer 700A may include an adhesive material, and may removably attach the display substrate DS and the first protection film PF1 to each other. In an embodiment, the first protection film PF1 may include a material having high acid resistance. The first protection film PF1 may include a material having high etching resistance.

A second adhesive layer 700B and a second protection film PF2 may be disposed below the glass substrate 100. The second adhesive layer 700B may be disposed between the glass substrate 100 and the second protection film PF2. The second adhesive layer 700B may include an adhesive material, and may removably attach the display substrate DS and the second protection film PF2 to each other. In an embodiment, the second protection film PF2 may include a material having high acid resistance. The second protection film PF2 may include a material having high etching resistance.

Figure 13C:
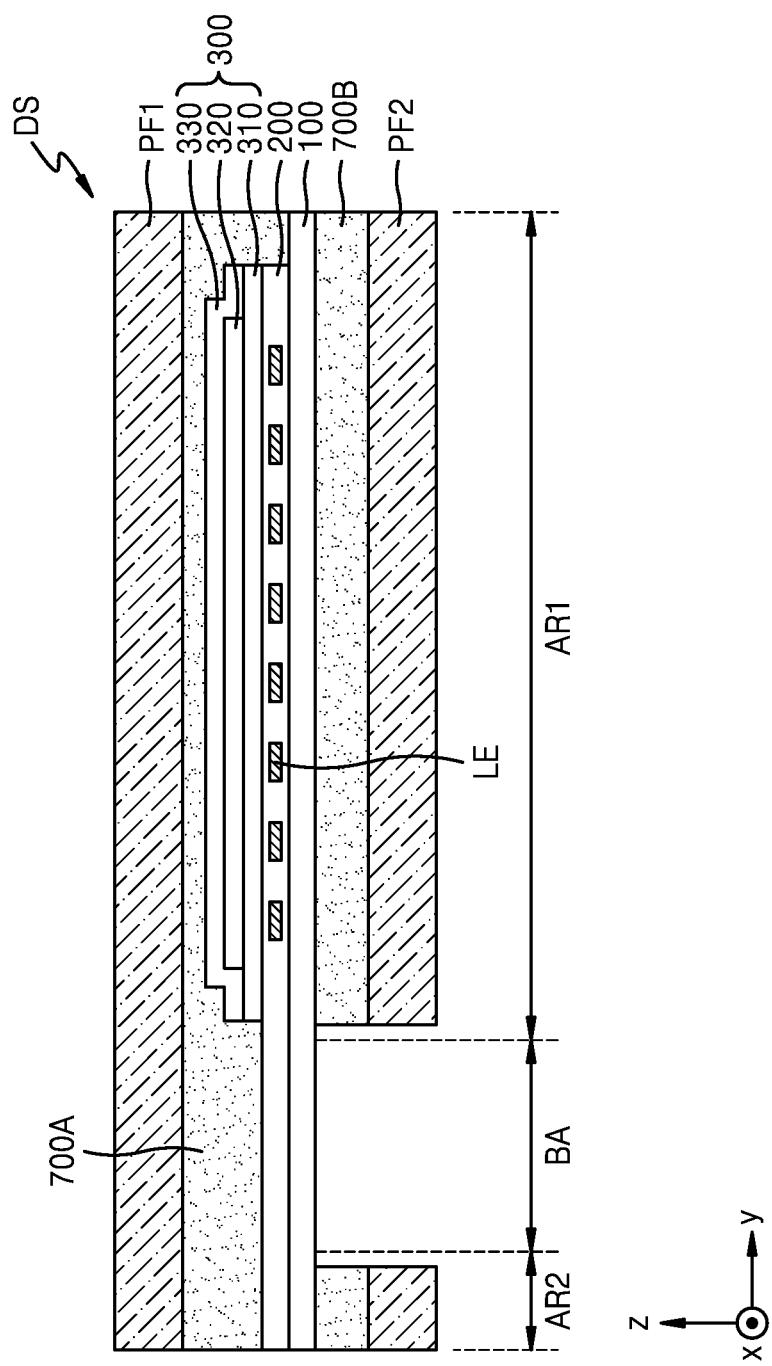

Referring to FIG. 13C, part of the second protection film PF2 may be removed. The removed part of the second protection film PF2 may overlap the bending area BA. When the part of the second protection film PF2 is removed, part of the second adhesive layer 700B may be removed as well. In an embodiment, the second protection film PF2 may be removed by using a laser. In an embodiment, for example, a laser may be irradiated along an edge of the second protection film PF2 that is to be removed. In this case, the laser may be irradiated onto the second protection film PF2 and may not be irradiated onto the second adhesive layer 700B. Accordingly, the display substrate DS may be prevented or reduced from being damaged by a laser. In an embodiment, the second protection film PF2 may be removed by using a blade of a knife.

Figure 13D:
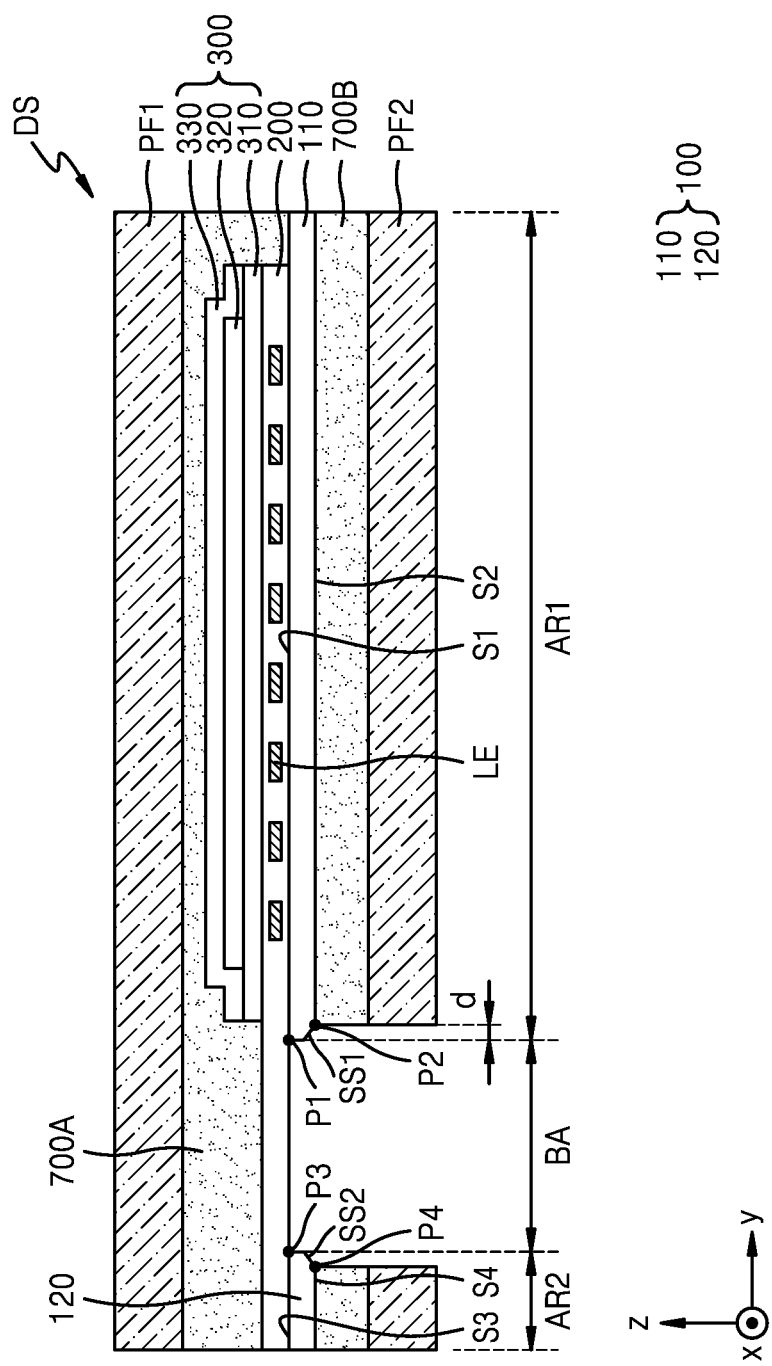

Referring to FIG. 13D, the glass substrate 100 overlapping the bending area BA may be etched. The glass substrate 100 may be dry-etched or wet-etched. In an embodiment, an etching method may include a spray method of spraying an etching material or a dipping method of dipping the display substrate DS in an etchant.

The glass substrate 100 that is etched may include the first glass substrate 110 and the second glass substrate 120 disconnected from each other at the bending area BA. The first glass substrate 110 may include the first surface S1, the second surface S2, and the first side surface SS1. The first surface S1 may be a surface facing the display layer 200. The second surface S2 may be a surface opposite to the first surface S1. The first side surface SS1 may be connected to the first surface S1 at the first position P1. The first side surface SS1 may be connected to the second surface S2 at the second position P2. The first side surface SS1 may be at least partially inclined. At least part of the first side surface SS1 may extend in a direction crossing the length direction of the first glass substrate 110, for example, the y direction, and the thickness direction of the first glass substrate 110, for example, the z direction. In an embodiment, the first side surface SS1 may include a vertical part extending in the thickness direction of the first glass substrate 110, for example, the z direction, and an inclined part. In an embodiment, the first side surface SS1 may be inclined as a whole. As the first glass substrate 110 includes the first side surface SS1 that is at least partially inclined, the strength of the first glass substrate 110 may be increased, and even when shocks are applied from the outside, the first glass substrate 110 may absorb shocks.

The first position P1 may be closer to the display layer 200 than the second position P2. The first position P1 may be closer to the bending area BA than the second position P2. Accordingly, at least part of the first side surface SS1 may be a tapered surface of the first glass substrate 110. In an embodiment, the length d of the first side surface SS1 in the length direction of the first glass substrate 110, for example, the y direction, may have a range of about 30 μm to about 500 μm. In an embodiment, the length d of the first side surface SS1 in the length direction of the first glass substrate 110, for example, the y direction, may have a range of about 30 μm to about 350 μm.

The surface roughness of the first side surface SS1 may be less than the surface roughness of the first surface S1. In an embodiment, the surface roughness may be the center line average roughness (Ra). When the first side surface SS1 is formed by removing at least part of the glass substrate 100 in a mechanical method such as grinding and the like, the surface roughness of the first side surface SS1 may be greater than the surface roughness of the first surface S1. In the present embodiment, the first side surface SS1 that is a surface formed by etching the glass substrate 100 (e.g., etched side surface) may be smoother than the first surface S1 and/or the second surface S2. In this case, the strength of the display panel 10 may be increased. In embodiments, etching residue may remain on the first side surface SS1 and the second side surface SS2.

The second glass substrate 120 may include the third surface S3, the fourth surface S4, and the second side surface SS2. The third surface S3 may be a surface facing the display layer 200. The third surface S3 may be flat. The third surface S3 may extend in the first direction, for example, the x direction, and/or the second direction, for example, the y direction. The fourth surface S4 may be a surface opposite to the third surface S3. The fourth surface S4 may be flat. The fourth surface S4 may extend in the first direction, for example, the x direction, and/or the second direction, for example, the y direction.

The second side surface SS2 may be connected to the third surface S3 at the third position P3. The second side surface SS2 may be connected to the fourth surface S4 at the fourth position P4. The second side surface SS2 may be at least partially inclined. At least part of the second side surface SS2 may extend in a direction crossing the length direction of the second glass substrate 120, for example, the y direction, and the thickness direction of the second glass substrate 120, for example, the z direction. In an embodiment, the second side surface SS2 may include a vertical part extending in the thickness direction of the second glass substrate 120, for example, the z direction, and an inclined part. In an embodiment, the second side surface SS2 may be inclined as a whole. As the second glass substrate 120 includes the second side surface SS2 that is at least partially inclined, the strength of the second glass substrate 120 may be increased, and even when shocks are applied from the outside, the glass substrate 100 may absorb the shocks.

The third position P3 may be closer to the display layer 200 than the fourth position P4. The third position P3 may be closer to the bending area BA than the fourth position P4. Accordingly, at least part of the second side surface SS2 may be a tapered surface of the second glass substrate 120. In an embodiment, the length of the second side surface SS2 in the length direction of the second glass substrate 120, for example, the y direction, may have a range of about 30 μm to about 500 μm. In an embodiment, the length of the second side surface SS2 in the length direction of the second glass substrate 120, for example, the y direction, may have a range of about 30 μm to about 350 μm.

The surface roughness of the second side surface SS2 may be less than the surface roughness of the third surface S3. In an embodiment, the surface roughness may be the center line average roughness (Ra). When the second side surface SS2 is formed by removing at least part of the glass substrate 100 in a mechanical method such as grinding and the like, the surface roughness of the second side surface SS2 may be greater than the surface roughness of the third surface S3. In the present embodiment, the second side surface SS2 is a surface formed by etching the glass substrate 100 and may be smoother than the third surface S3 and the fourth surface S4. In this case, the strength of the display panel 10 may be increased.

Although not illustrated, in embodiments, a glass member GM may remain in the bending area BA. The glass member GM may be glass that remains in the bending area BA after the glass substrate 100 is etched. The glass member GM may have an irregular shape. The thickness GMt of the glass member GM may be about 30 μm or less.

Unlike the present embodiment, when the glass substrate 100 overlapping the bending area BA is removed by irradiating a laser, the display substrate DS may be damaged by the laser. In the present embodiment, as the glass substrate 100 overlapping the bending area BA is removed by using an etching process, the quality of a manufactured display device may be increased.

Figure 13E:
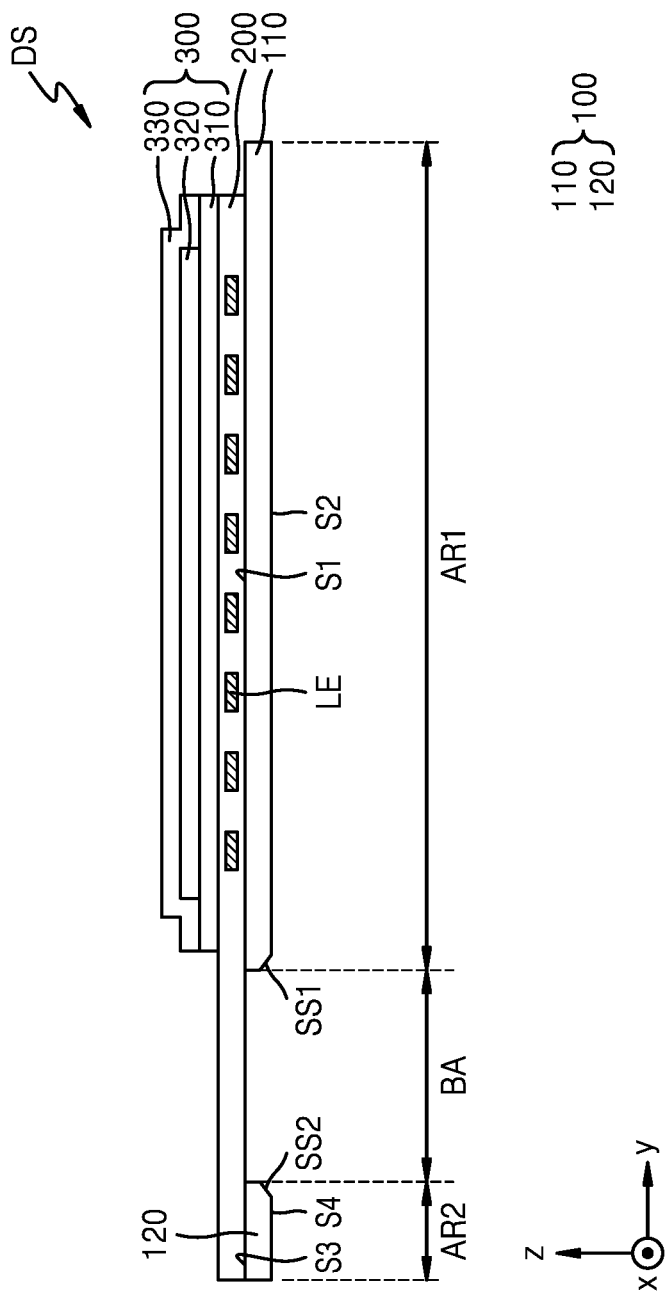

Referring to FIG. 13E, the first adhesive layer 700A and the first protection film PF1 may be removed. Furthermore, the second adhesive layer 700B and the second protection film PF2 may be removed. In this case, an adhesive member 700 including an adhesive material may remain below the glass substrate 100. The adhesive member 700 may be a leftover of part of the second adhesive layer 700B below the glass substrate 100 when the second adhesive layer 700B is removed.

In an embodiment, the adhesive member 700 may not remain on the first side surface SS1 and the second side surface SS2. This is because the first side surface SS1 and the second side surface SS2 are surfaces formed by etching the glass substrate 100.

Figure 13F:
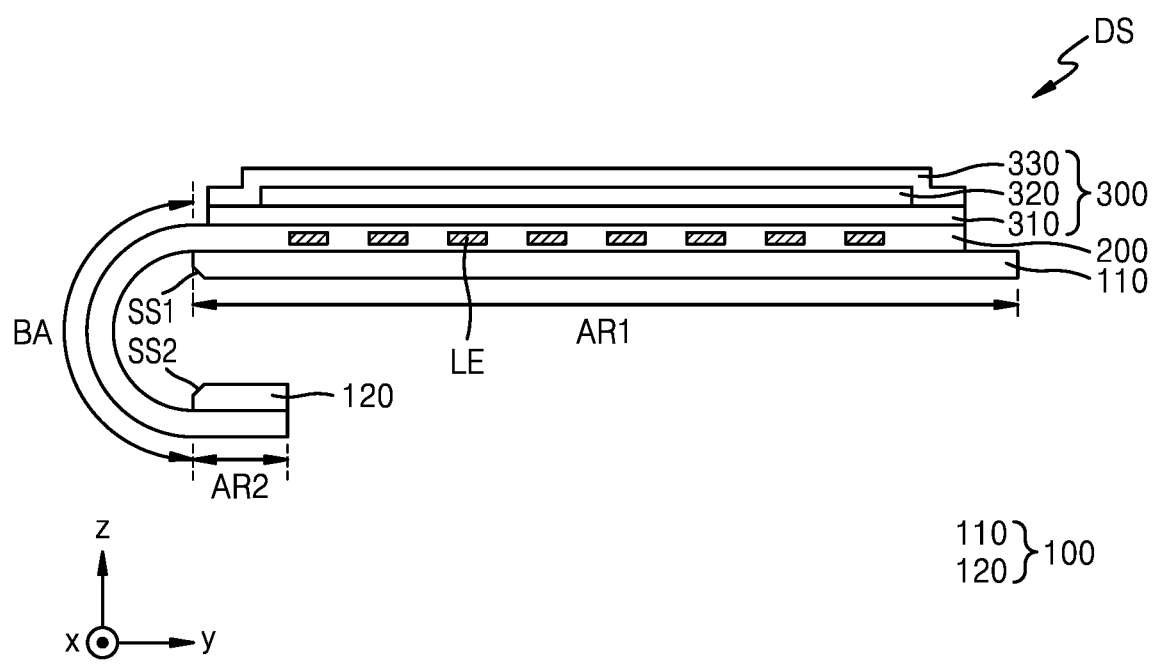

Referring to FIG. 13F, the display substrate DS may be bent at the bending area BA. In an embodiment, for example, the bending area BA may be bent around an axis extending in the x direction of FIG. 13F. As the glass substrate 100 overlapping the bending area BA is removed, the display substrate DS may be flexibly bent. In a display device 1 which is finally provided, the bending area BA may be in a bent state. In embodiments, an operation of bending the bending area BA may be omitted.

FIGS. 14A to 14F are schematic plan views showing a method of manufacturing a display device 1 according to an embodiment.

Figure 14A:
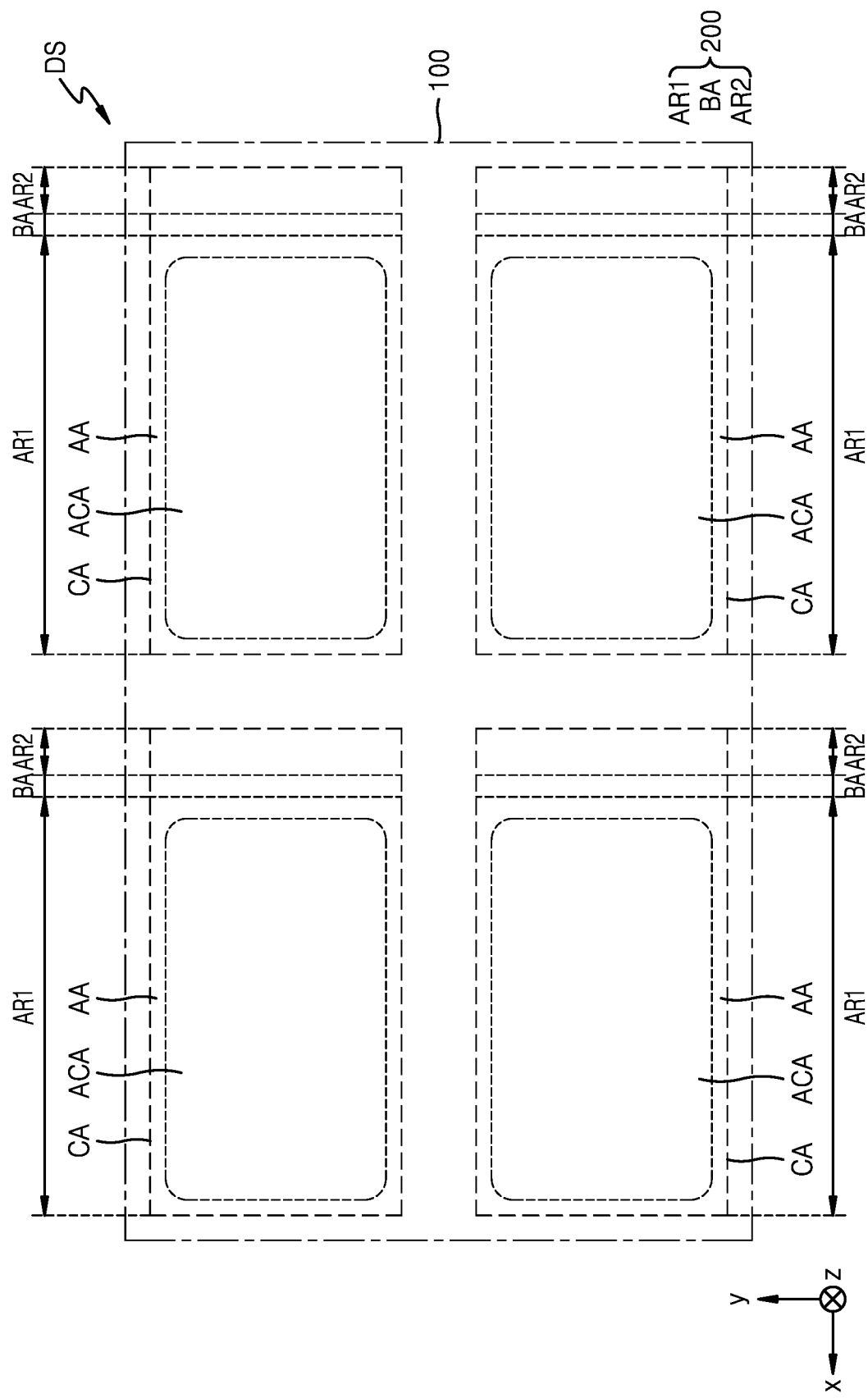

Referring to FIG. 14A, the display substrate DS may be prepared. The display substrate DS may include the glass substrate 100 (e.g., mother substrate) together with the display layer 200. The display layer 200 may include a plurality of display layers 200 on the mother substrate. In other words, the display substrate DS may include a plurality of cell areas CA on the mother substrate. The plurality of cell areas CA may be areas occupied by the plurality of display layers 200, in a plan view. Alternatively, the plurality of cell areas CA may be preliminary display panels and/or preliminary display devices in an intermediate form which are being manufactured (or provided). The plurality of cell areas CA may be disposed in the first direction, for example, the x direction, and/or the second direction, for example, the y direction. Although FIG. 14A illustrates four cell areas CA, in an embodiment, the display substrate DS may include four or less cell areas CA or four or more cell areas CA.

The plurality of display layers 200 may each include the first area AR1, the bending area BA, and the second area AR2. In other words, the plurality of display layers 200 may include a plurality of first areas AR1, a plurality of bending areas BA, and a plurality of second areas AR2 along the mother substrate.

Referring to FIGS. 14B to 14E, the bending area BA of the display layer 200 may be exposed by etching the glass substrate 100. In an embodiment, the plurality of bending areas BA may be exposed by etching the glass substrate 100.

Referring to FIG. 14B, a protection film PF may be disposed on the glass substrate 100. In an embodiment, the protection film PF may include a material having high acid resistance. The protection film PF may include a material having high etching resistance. In an embodiment, the adhesive layer may be disposed between the protection film PF and the glass substrate 100. The adhesive layer may removably attach the protection film PF and the glass substrate 100 to each other.

Figure 14C:
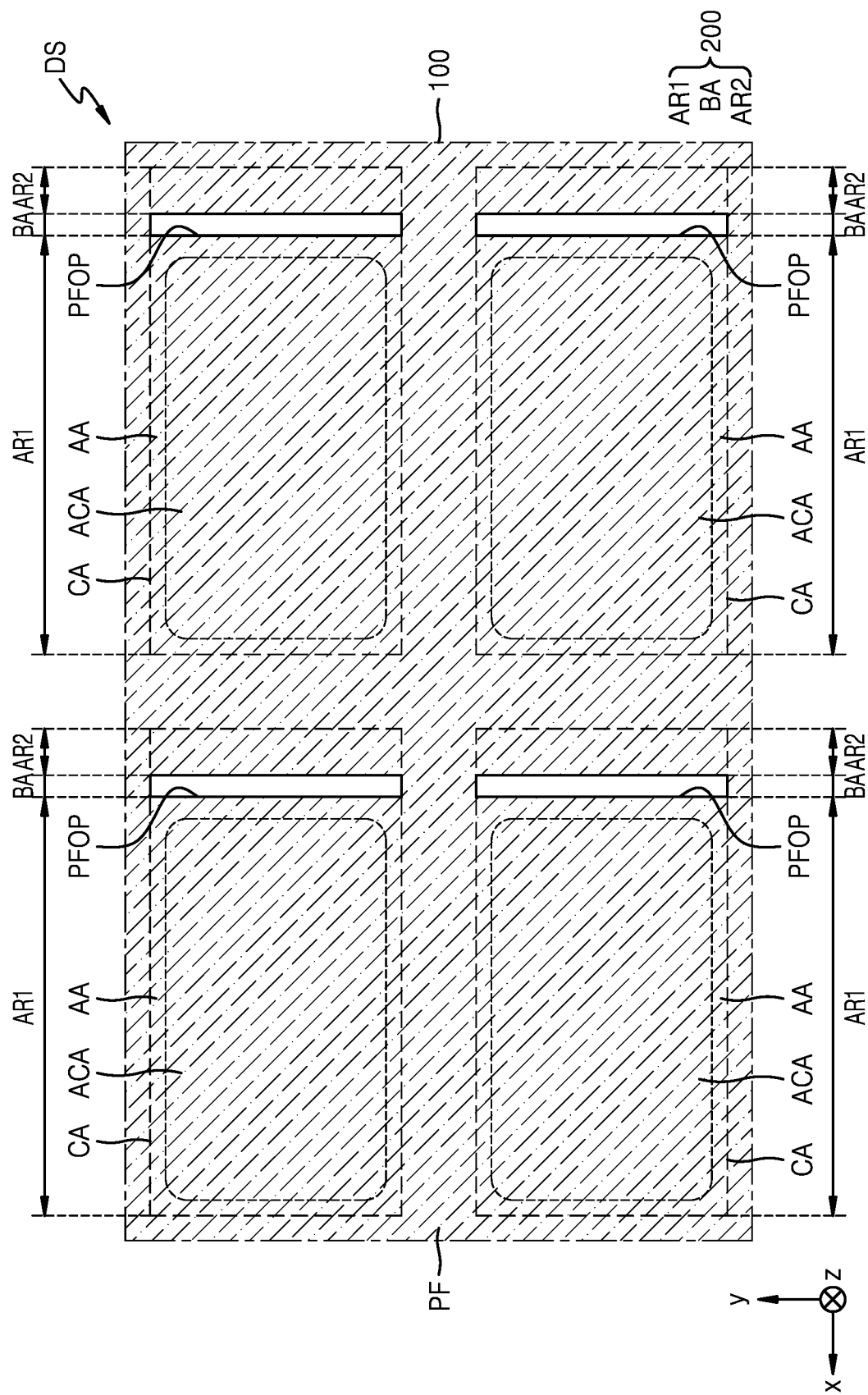

Referring to FIG. 14C, part of the protection film PF may be removed. The removed part of the protection film PF may overlap the bending area BA. In an embodiment, the protection film PF may be removed by using a laser. In an embodiment, the protection film PF may be removed by using a blade of a knife.

As part of the protection film PF is removed, a protection film opening portion PFOP may be formed. The protection film opening portion PFOP may include a plurality of protection film opening portions PFOP along the mother substrate respectively corresponding to the plurality of cell areas CA. In an embodiment, the plurality of protection film opening portions PFOP may overlap the bending areas BA, respectively.

Figure 14D:
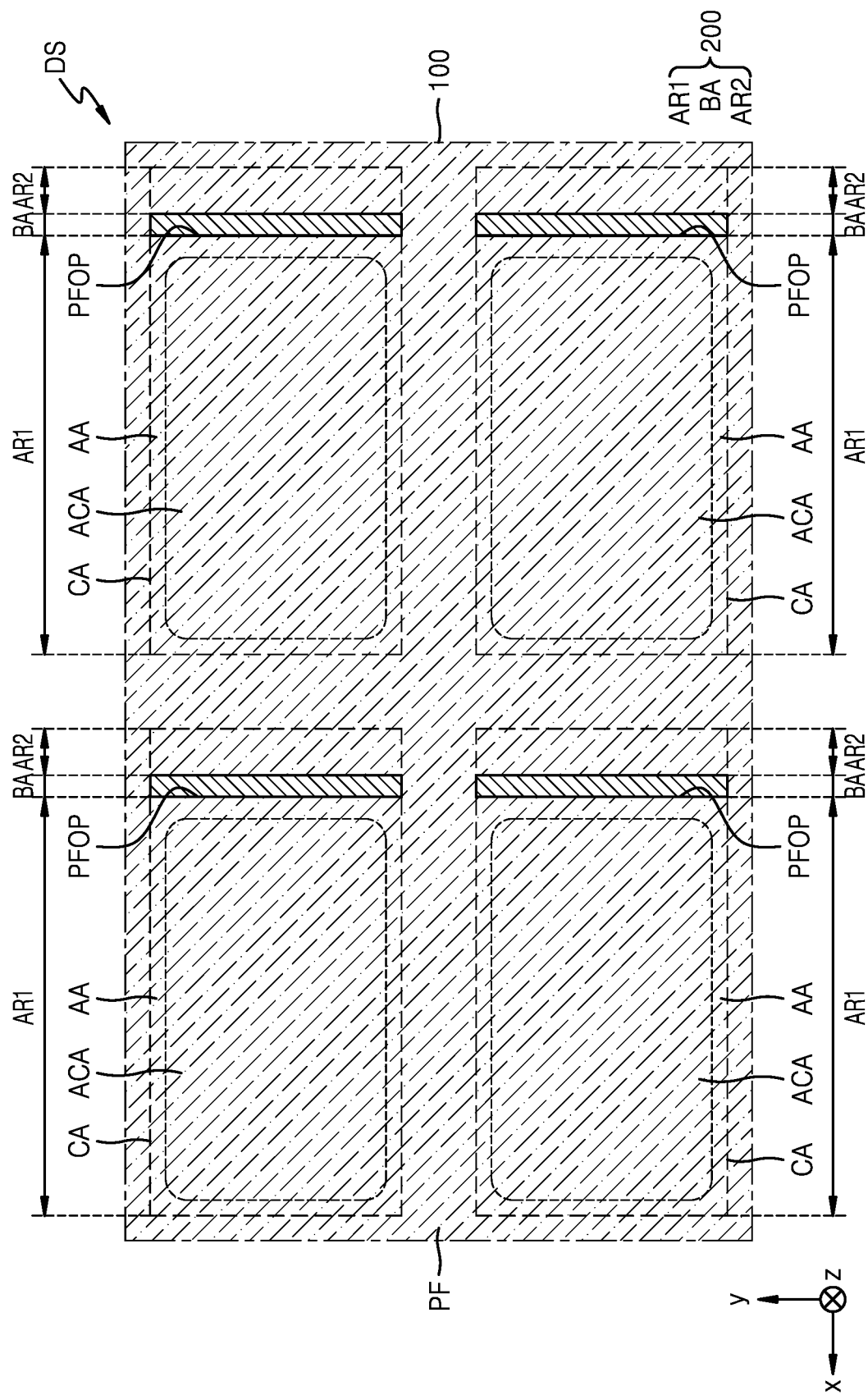

Referring to FIG. 14D, the glass substrate 100 overlapping the bending area BA may be etched. The glass substrate 100 may be dry-etched or wet-etched. In an embodiment, the etching method may include a spray method of spraying an etching material or a dipping method of dipping the display substrate DS in an etchant. Accordingly, the bending area BA may be exposed. In an embodiment, the plurality of bending areas BA may be exposed.

Although not illustrated, in embodiments, a glass member GM may remain in the bending area BA. The glass member GM may be glass remaining in the bending area BA after the glass substrate 100 is etched. The glass member GM may have an irregular shape.

Unlike the present embodiment, when the glass substrate 100 overlapping the bending area BA is removed by irradiating a laser, the display substrate DS may be damaged by the laser. In the present embodiment, as portions of the glass substrate 100 overlapping the bending area BA is removed by using an etching process, the quality of a manufactured display device may be increased.

Figure 14E:
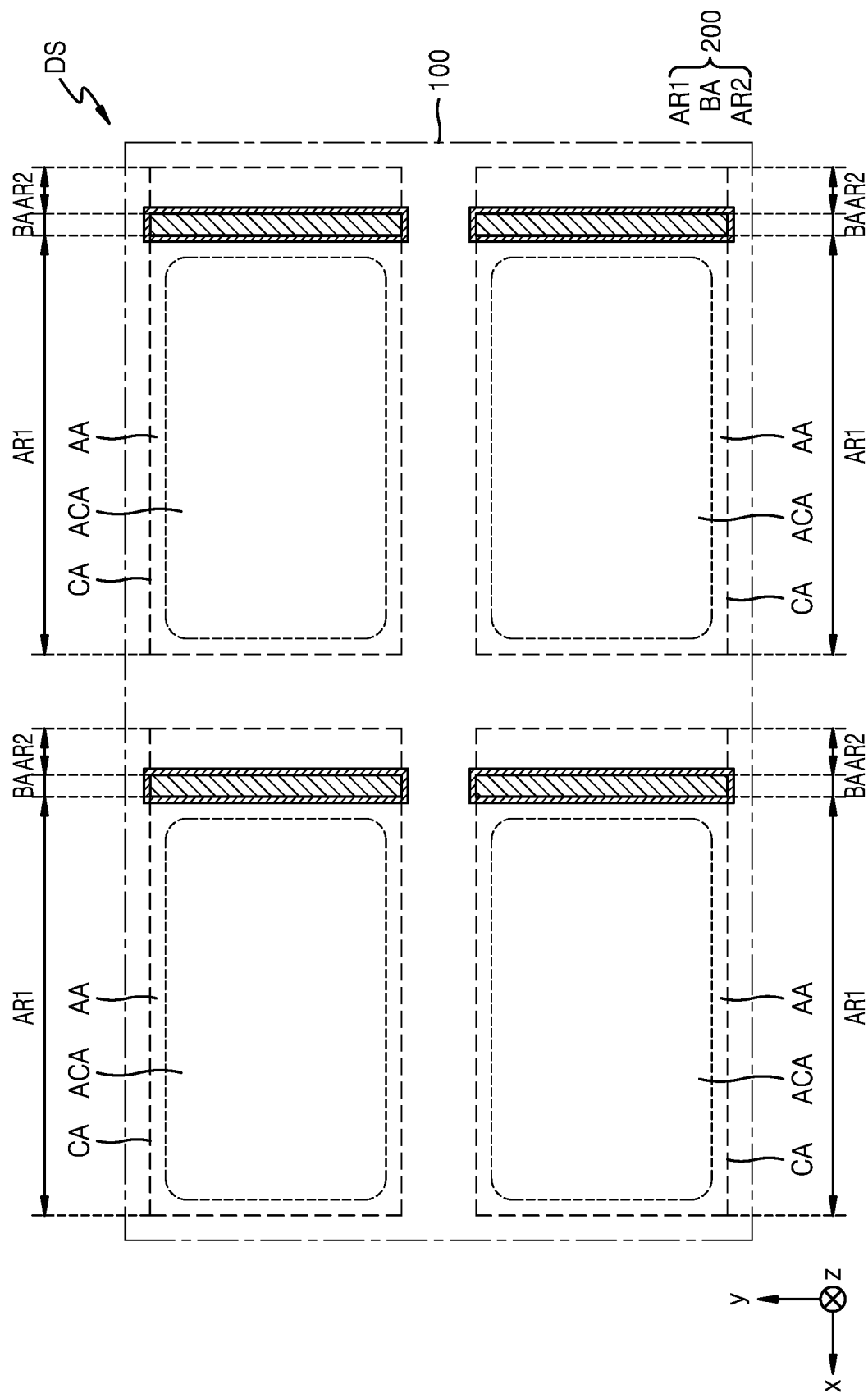

Referring to FIG. 14E, the protection film PF may be removed. In this case, an adhesive member 700 including an adhesive material may remain below the glass substrate 100. The adhesive member 700 may be a leftover of the adhesive layer remaining below the glass substrate 100 when the adhesive layer is removed.

Part of the glass substrate 100 adjacent to the bending area BA may have a tapered surface. The tapered surface may be a surface formed when the glass substrate 100 is etched (e.g., etched surface). In an embodiment, the glass substrate 100 may include a plurality of tapered (etched) surfaces.

Referring to FIG. 14F, after the plurality of bending areas BA is exposed, the plurality of display layers 200 may be separated from each other. In other words, a plurality of cell areas CA may be separated from each other. Accordingly, a plurality of display devices and/or display panels may be efficiency manufactured.

The glass substrate 100 that is etched may include the first glass substrate 110 as a first glass substrate portion and the second glass substrate 120 as a second glass substrate portion. The first glass substrate 110 may include the first side surface SS1 that is at least partially inclined. Accordingly, the strength of the first glass substrate 110 may be increased at the bending area BA, and even when shocks are applied from the outside, the glass substrate 100 may absorb the shocks. The second glass substrate 120 may include the second side surface SS2 that is at least partially inclined. Accordingly, the strength of the second glass substrate 120 may be increased at the bending area BA, and even when shocks are applied from the outside, the glass substrate 100 may absorb the shocks. The first side surface SS1 and the second side surface SS2 may be adjacent to the bending area BA of the display layer 200 that is exposed to outside the glass substrate 100.

As described above, the display device 1 according to one or more embodiment of the disclosure may include the first glass substrate 110 and the second glass substrate 120 that are separated (or disconnected) from each other at a bending area BA. Accordingly, the display device 1 may be bendable in various shapes and may have improved reliability.

Furthermore, the method of manufacturing (or providing) a display device 1 according to one or more embodiment of the disclosure may include an operation of exposing the bending area BA of the display layer 200 by etching the glass substrate 100. Accordingly, the display device 1 that is bendable in various shapes and has improved reliability may be manufactured.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display device comprising:
   a display layer comprising a first area including a light-emitting device, a bending area at which the display layer is bendable, and a second area, in order;
   a glass substrate comprising:
      a first glass substrate portion corresponding to the first area of the display layer and comprising a first side surface which is closest to the bending area;
      a second glass substrate portion spaced apart from the first glass substrate portion, corresponding to the second area of the display layer and comprising a second side surface which is closest to the bending area;
      the first side surface and the second side surface of the glass substrate including an inclined portion; and
      a glass member in the bending area; and
   an encapsulation layer facing the glass substrate with the display layer therebetween, the encapsulation layer comprising an inorganic encapsulation layer and an organic encapsulation layer,
   wherein
   each of the first glass substrate portion and the glass member of the glass substrate has a thickness, and
   the thickness of the glass member is less than the thickness of the first glass substrate portion.

2. The display device of claim 1, wherein
   the first glass substrate portion further comprises a first surface facing the display layer and connected to the first side surface at a first position, and a second surface opposite to the first surface and connected to the first side surface at a second position, and
   the first position is closer to the bending area than the second position.

3. The display device of claim 2, wherein
   the second glass substrate portion further comprises a third surface facing the display layer and connected to the second side surface at a third position, and a fourth surface opposite to the third surface and connected to the second side surface at a fourth position, and the third position is closer to the bending area than the fourth position.

4. The display device of claim 2, wherein each of the first side surface and the first surface of the first glass substrate portion has a surface roughness, and the surface roughness of the first side surface is less than the surface roughness of the first surface.

5. The display device of claim 1, wherein the first area, the bending area and the second area are in order in a length direction, and along the length direction, a length of the first side surface of the first glass substrate portion is about 30 micrometers to about 500 micrometers.

6. The display device of claim 1, wherein the display layer further comprises:

a pad electrode in the second area; and a connection wiring electrically connected to the pad electrode and extending from the second area, through the bending area, and to the first area.

7. The display device of claim 6, wherein the display layer further comprises in order from the glass substrate:

a first organic material layer corresponding to the bending area; and a second organic material layer corresponding to the bending area, and in the bending area, the connection wiring is between the first organic material layer and the second organic material layer.

8. The display device of claim 6, further comprising a touch sensor layer facing the display layer with the encapsulation layer therebetween, wherein the touch sensor layer comprises a touch electrode and a touch wiring, and the touch wiring of the touch sensor layer is electrically connected to the connection wiring of the display layer.

9. The display device of claim 6, wherein the display layer which is bent at the bending area disposes the first side surface and the second side surface facing the bending area.

10. The display device of claim 1, further comprising an adhesive member facing the display layer with the first glass substrate portion therebetween.

11. The display device of claim 1, further comprising an organic protection layer in the bending area, wherein the organic protection layer extends from the bending area to define a portion of the organic protection layer between the first glass substrate portion and the light-emitting device of the display layer.

12. The display device of claim 1, further comprising an organic protection layer in the bending area, wherein the organic protection layer extends from the bending area to the first glass substrate portion to define a protection layer side surface which is in the first area of the display layer and inclined, and the display layer further comprises an inorganic insulating layer facing the first glass substrate portion with the protection layer side surface therebetween.

13. The display device of claim 1, further comprising a filling layer between the first glass substrate portion and the second glass substrate portion which are spaced apart from each other.

14. The display device of claim 1, wherein the light-emitting device of the display layer comprises an organic light-emitting diode.

15. An electronic apparatus comprising:

a display device comprising:

a display layer comprising a first area including a light-emitting device, a bending area at which the display layer is bendable, and a second area, in order;

a glass substrate comprising:

a first glass substrate portion corresponding to the first area of the display layer and comprising a first side surface which is closest to the bending area;

a second glass substrate portion spaced apart from the first glass substrate portion, corresponding to the second area of the display layer and comprising a second side surface which is closest to the bending area;

the first side surface and the second side surface of the glass substrate including an inclined portion; and a glass member in the bending area; and an encapsulation layer facing the glass substrate with the display layer therebetween, the encapsulation layer comprising an inorganic encapsulation layer and an organic encapsulation layer, wherein each of the first glass substrate portion and the glass member of the glass substrate has a thickness, and the thickness of the glass member is less than the thickness of the first glass substrate portion.

* * * * *